(12) United States Patent
Maeda et al.

(10) Patent No.: US 11,433,430 B2
(45) Date of Patent: Sep. 6, 2022

(54) ARTICLE DISCHARGE SYSTEM

(71) Applicant: Ishida Co., Ltd., Kyoto (JP)

(72) Inventors: Shuichi Maeda, Ritto (JP); Yujiro Obayashi, Ritto (JP); Masaaki Hojo, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 172 days.

(21) Appl. No.: 16/890,579

(22) Filed: Jun. 2, 2020

(65) Prior Publication Data

US 2020/0398314 A1 Dec. 24, 2020

(30) Foreign Application Priority Data

Jun. 21, 2019 (JP) .............................. JP2019-115682

(51) Int. Cl.
*B07C 5/28* (2006.01)
*B07C 5/24* (2006.01)
(Continued)

(52) U.S. Cl.
CPC ................. *B07C 5/28* (2013.01); *B07C 5/24* (2013.01); *B07C 5/362* (2013.01); *B65G 11/00* (2013.01);
(Continued)

(58) Field of Classification Search
CPC .... B07C 5/16; B07C 5/24; B07C 5/28; B07C 5/362; B07C 5/38; B25J 9/1638; B25J 19/02; B65G 47/907
See application file for complete search history.

(56) References Cited

U.S. PATENT DOCUMENTS 4,765,124 A 8/1988 Nakamura
5,321,212 A 6/1994 Wadell
(Continued)

FOREIGN PATENT DOCUMENTS

EP 2042277 A1 4/2009
EP 3441154 A1 2/2019
(Continued)

OTHER PUBLICATIONS

An Examination Report mailed by the Australian Patent Office dated Feb. 25, 2021, which corresponds to Australian Patent Application 2020203723 and is related to U.S. Appl. No. 16/890,579.
(Continued)

*Primary Examiner* — William R Harp
(74) *Attorney, Agent, or Firm* — Studebaker & Brackett PC

(57) ABSTRACT

An article discharge system includes a placement unit in which the article group is placed, plural grippers, a movable member, a robot that moves the movable member, weight acquisition units, and a control unit. The plural grippers grip some articles with gripping member. The plural grippers are attached to the movable member. The weight acquisition units acquire weight values of the articles that each of the grippers grips. The control unit moves the movable member, brings the plural grippers closer to the placement unit, causes the plural grippers to grip some of the articles of the article group placed in the placement unit, and, based on the result of a combination calculation using the weight values of the articles that each of the grippers grips and which the weight acquisition units have acquired, causes predetermined grippers among the plural grippers to release the articles and thereby discharge the articles.

8 Claims, 19 Drawing Sheets

(51) Int. Cl.
    *B07C 5/36*     (2006.01)
    *B65G 47/90*     (2006.01)
    *B65G 11/00*     (2006.01)
    *B65G 47/12*     (2006.01)

(52) U.S. Cl.
    CPC ........... *B65G 47/12* (2013.01); *B65G 47/905* (2013.01); *B65G 47/907* (2013.01)

(56) References Cited

U.S. PATENT DOCUMENTS

| | | | |
|---|---|---|---|
| 8,688,264 B2 * | 4/2014 | Nignon | B65G 47/90 700/223 |
| 2013/0110280 A1 | 5/2013 | Folk | |
| 2018/0340819 A1 | 11/2018 | Taira | |

FOREIGN PATENT DOCUMENTS

| | | |
|---|---|---|
| JP | H06-003182 A | 1/1994 |
| JP | 2013-195199 A | 9/2013 |

OTHER PUBLICATIONS

YouTube Video; David Haller; "Bucknell Robot Object Sorting by Weight"; Feb. 10, 2009; pp. 1-2 XP054981081; URL: https://www.youtube.com/watch?v=djsN-Thc2KA (retrieved on Nov. 6, 2020).
The extended European search report issued by the European Patent Office dated Nov. 17, 2020, which corresponds to European Patent Application No. 20179068.0-1205 and is related to U.S. Appl. No. 16/890,579.
Communication pursuant to Article 94(3) EPC issued by the European Patent Office dated Mar. 29, 2022, which corresponds to European Patent Application No. 20 179 068.0-1205 and is related to U.S. Appl. No. 16/890,579.

* cited by examiner

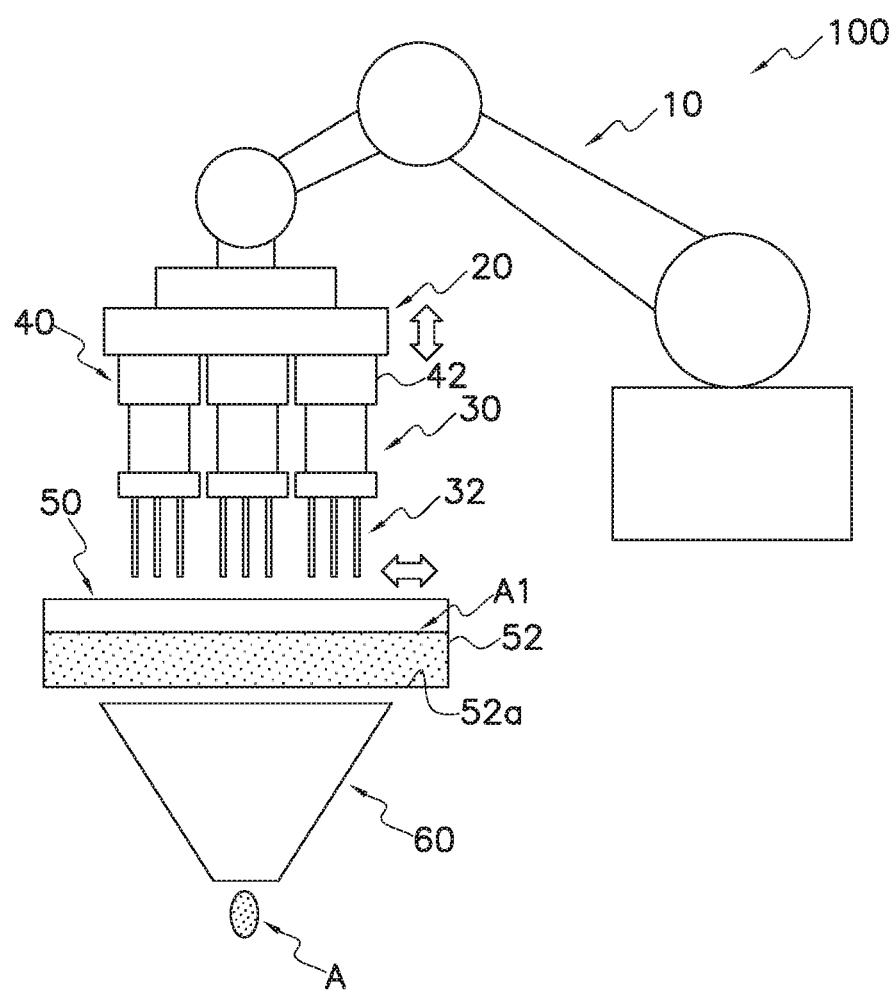
F I G. 1

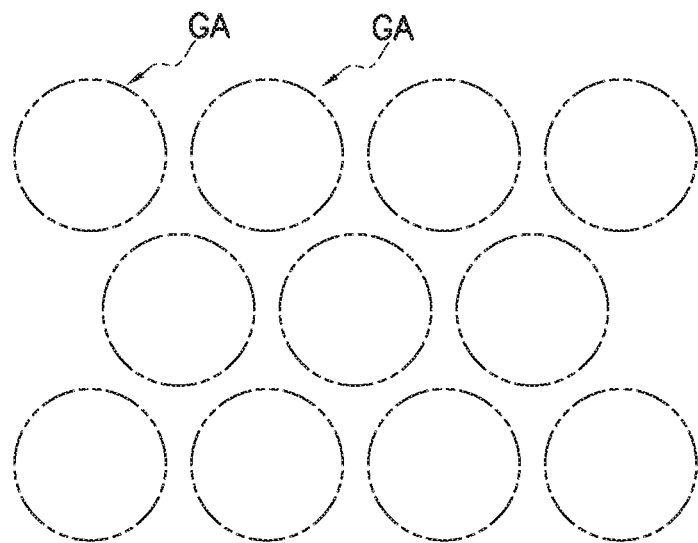
F I G. 7 A
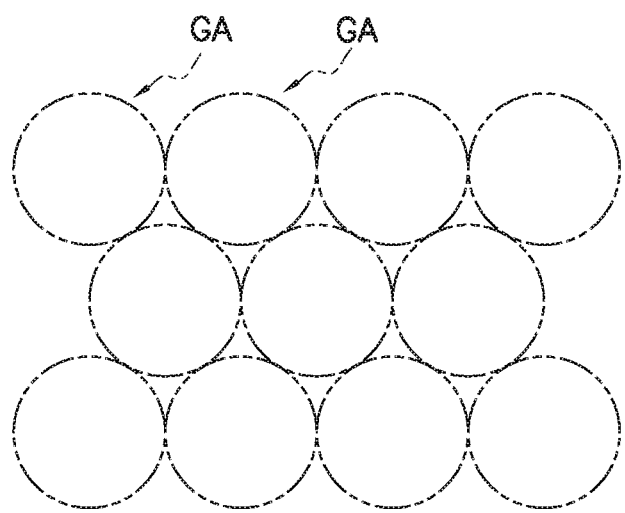
F I G. 7 B

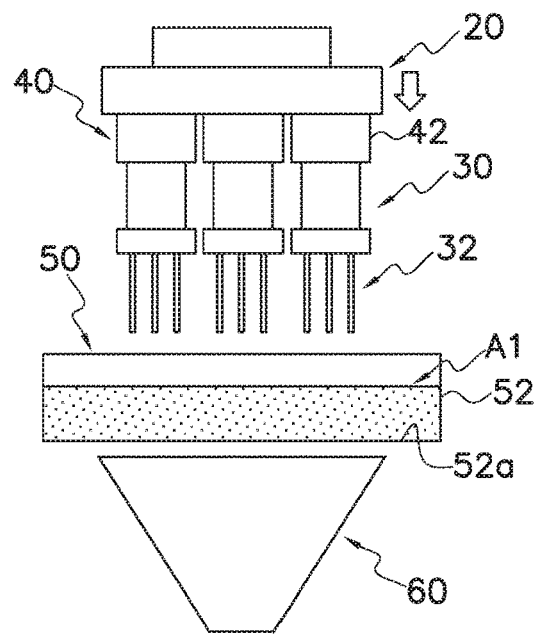
F I G. 8 A
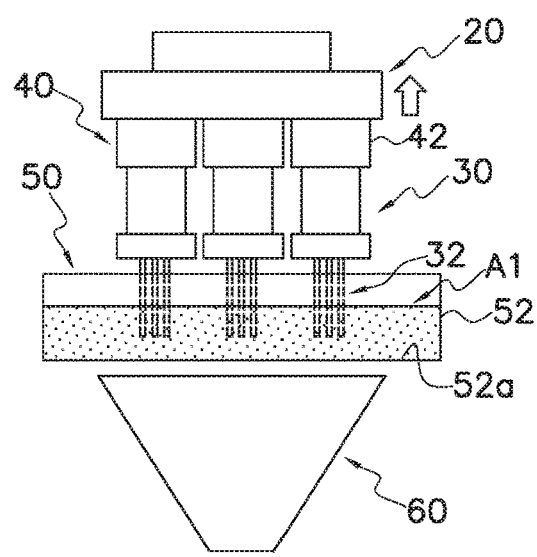
F I G. 8 B

ARTICLE DISCHARGE SYSTEM

BACKGROUND

Technical Field

The present invention relates to an article discharge system that pulls out and discharges some articles from an article group.

Related Art

An article discharge system is known which, as in patent document 1 (JP-A No. H6-3182), uses plural grippers to pull out articles from an article group placed in a placement unit, acquires the weight values of the articles that each of the grippers is gripping, performs a combination calculation, on the basis of the result thereof causes predetermined grippers to release the articles in a predetermined position, and finally discharges articles with a target weight to the outside of the system.

SUMMARY

Technical Problem

However, the article discharge system of patent document 1 (JP-A No. H6-3182) has the problem that the system tends to increase in size because each of the grippers is attached to a movable member that operates independently.

It is an object of the present invention to provide an article discharge system that can be made compact.

Solution to Problem

An article discharge system pertaining to a first aspect pulls out some articles from an article group and discharges them. The article discharge system includes a placement unit, plural grippers, a movable member, a first drive unit, weight acquisition units, and a control unit. The article group is placed in the placement unit. The plural grippers grip, with gripping members, the articles. The plural grippers are attached to the movable member. The first drive unit moves the movable member. The weight acquisition units acquire weight values of the articles that each of the grippers grips. The control unit moves the movable member, brings the plural grippers closer to the placement unit, and causes the plural grippers to grip some of the articles of the article group placed in the placement unit. On the basis of the result of a combination calculation using the weight values of the articles that each of the grippers grips and which the weight acquisition units have acquired, the control unit causes predetermined grippers among the plural grippers to release the articles and thereby discharge the articles.

In the article discharge system pertaining to the first aspect, the grippers are not attached to respectively different movable members; rather, the plural grippers are attached to the movable member, so a compact article discharge system can be realized.

Furthermore, by providing the plural grippers in the single movable member, the number of drive units for moving the grippers closer to the placement number can be reduced in contrast to a case where a single gripper is provided in the movable member.

An article discharge system pertaining to a second aspect is the article discharge system pertaining to the first aspect, wherein the control unit moves the movable member at least downward from a predetermined position to bring the plural grippers closer to the placement unit when the grippers are to grip the articles in the placement unit. The placement unit has a placement surface on which the article group is placed. The plural grippers include at least a first gripper and a second gripper. A first portion of the placement surface on which are placed the articles that the first gripper grips is disposed in a higher position than a second portion of the placement surface on which are placed the articles that the second gripper grips. In the movable member, a lower end of the gripping member of the first gripper is disposed in a higher position than a lower end of the gripping member of the second gripper.

In the article discharge system pertaining to the second aspect, the height positions of the lower ends of the gripping members of the grippers change in accordance with the height position of the placement surface on which are placed the articles that the grippers grip. For that reason, it is easy for each of the plural grippers provided in the same movable member to take an appropriate quantity of the articles from the placement unit whose placement surface is not level.

An article discharge system pertaining to a third aspect is the article discharge system pertaining to the second aspect, wherein a difference between the height positions of the lower end of the gripping member of the first gripper and the lower end of the gripping member of the second gripper in the movable member is identical to a difference between the height positions of the first portion of the placement surface and the second portion of the placement surface.

In the article discharge system pertaining to the third aspect, the distance between the placement surface on which are placed the articles that each of the gripper grips and the lower end of the gripping member of that gripper is set identically. It is therefore easy for each of the plural grippers provided in the same movable member to take an appropriate quantity of the articles from the placement unit whose placement surface is not level.

An article discharge system pertaining to a fourth aspect is the article discharge system pertaining to any of the first to the third aspect, wherein the plural grippers are arranged in a staggered manner when the plural grippers are viewed from the gripping member side.

In the article discharge system pertaining to the fourth aspect, the grippers are arranged in a staggered manner when viewed from the gripping member side, so a large number of the grippers can be arranged in a small space and it is easy to make the article discharge system compact.

An article discharge system pertaining to a fifth aspect is the article discharge system pertaining to any of the first aspect to the fourth aspect, wherein a gripping area in which each of the grippers can grip the articles in the placement unit is in proximity to or partially overlaps a gripping area in which at least one other gripper can grip the articles in the placement unit.

In the article discharge system pertaining to the fifth aspect, the gripping area of certain gripper is adjacent to or overlaps the gripping area of at least one other gripper, so a large number of the grippers can be arranged in a small space and it is easy to make the article discharge system compact.

An article discharge system pertaining to a sixth aspect is the article discharge system pertaining to any of the first aspect to the fifth aspect, further including a discharge chute and a second drive unit. The discharge chute is disposed directly under the grippers. The discharge chute receives and discharges the articles that the grippers have released. The second drive unit moves the placement unit. The first drive unit moves the movable member in the vertical direction.

The second drive unit moves, in a direction intersecting the vertical direction, the placement unit between a first position directly under the grippers and a second position away from directly under the grippers.

In the article discharge system pertaining to the sixth aspect, the movable member moves in the vertical direction, so a force in the horizontal direction is less likely to act on the articles that the grippers grip. For that reason, the occurrence of a problem where the articles that the grippers grip unintentionally drop is easily reduced. For that reason, in this article discharge system, it is easy to accurately discharge the articles with the target weight. Furthermore, in this article discharge system, the discharge chute is disposed directly under the grippers, and the placement unit is configured to be movable between the first position directly under the grippers and the second position away from directly under the grippers. For that reason, in this article discharge system, the articles that the grippers grip can be supplied directly to the discharge chute without moving the grippers in the horizontal direction. Therefore, the potential for the articles to stick to a member other than the grippers and the discharge chute can be reduced, and the risk that the articles will stick to system components can be reduced to thereby improve the cleanliness of the system.

An article discharge system pertaining to a seventh aspect is the article discharge system pertaining to any of the first aspect to the sixth aspect, further including a separation member. The separation member is disposed between the gripping members of adjacent grippers at least during a predetermined period after the gripping members of the grippers grip the articles in the placement unit until they release the articles.

Depending on the articles that are handled, there is the potential for a phenomenon to occur where an article gripped by one gripper is also simultaneously gripped by another gripper. When such a phenomenon occurs, there is a concern that the weight of the articles discharged from the system will deviate from the target weight, resulting in a drop in the accuracy of the weight discharged from the system.

However, in the article discharge system pertaining to the seventh aspect, separation of the articles is promoted by the separation member, so the occurrence of a state where an article is simultaneously gripped by more than one gripper can be reduced to thereby reduce the weight of the articles discharged from the system from deviating from the target weight.

Advantageous Effects of Invention

In the article discharge system pertaining to the invention, the grippers are not attached to respectively different movable members; rather, the plural grippers are attached to the movable member, so a compact article discharge system can be realized.

BRIEF DESCRIPTION OF THE DRAWINGS

FIG. 1 is a schematic view of an article discharge system pertaining to a first embodiment of the invention;

FIG. 7A is a plan view schematically showing an example of an arrangement pattern of gripping areas of the plural grippers;

FIG. 7B is a plan view schematically showing another example of an arrangement pattern of the gripping areas of the plural grippers;

FIG. 8A is a general side view of main portions of the article discharge system for describing the operation of the article discharge system of FIG. 1, and illustrates a state (an initial state) before the grippers grip articles;

FIG. 8B is a general side view of main portions of the article discharge system for describing the operation of the article discharge system of FIG. 1, and illustrates a state in which the gripping members of the grippers have been inserted into an article group to grip the articles;

DETAILED DESCRIPTION

Embodiments of an article discharge system of the invention will be described below.

First Embodiment

Figure 2:
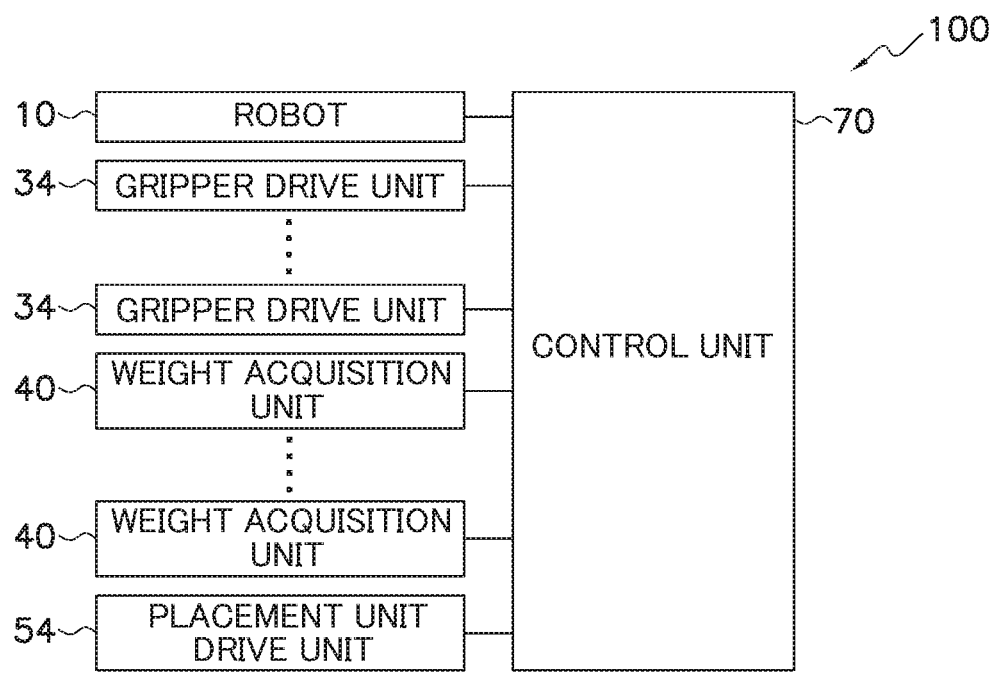
FIG. 2 is a block diagram of the article discharge system of FIG. 1.

An article discharge system 100 pertaining to a first embodiment of the invention will be described.
(1) Overview An overview of the article discharge system 100 will be described mainly with reference to FIG. 1 and FIG. 2. FIG. 1 is a schematic view of the article discharge system 100. FIG. 2 is a block diagram of the article discharge system 100.

The article discharge system 100 is a system that pulls out some articles A from an article group A1 that is a collection of the articles A and discharges them. Specifically, the article discharge system 100 pulls out from the article group A1 some of the articles A so that their weight falls within a target weight range and discharges the articles A from the article discharge system 100. Although this is not intended to be limiting, the articles A that are discharged from the article discharge system 100 are packaged in bags or put into containers in a post process (not shown in the drawings) after the article discharge system 100 and are shipped as products.

The article discharge system 100 mainly includes a placement unit 50, a placement unit drive unit 54, plural grippers 30, a movable member 20, a robot 10, weight acquisition units 40, a discharge chute 60, and a control unit 70 (see FIG. 1 and FIG. 2). These configurations will be generally described.

The article group A1 is placed in the placement unit 50. Although this is not intended to be limiting, the articles A are, for example, a food. Furthermore, although this is not intended to be limiting, the articles A are, for example, a sticky food, such as noodles like a spaghetti or a food that includes many saccharide. The placement unit 50 is moved by the placement unit drive unit 54 between a first position in which the grippers 30 can grip the articles A of the article group A1 placed in the placement unit 50 and a second position in which the grippers 30 cannot grip the articles A from the article group A1 placed in the placement unit 50. Each of the grippers 30 has gripping members 32. The grippers 30 grip, with the gripping members 32, the articles A. The plural grippers 30 are attached to the movable member 20. The robot 10 moves the movable member 20 to which the plural grippers 30 are attached. The weight acquisition units 40 acquire weight values of the articles A that each of the grippers 30 grips. The discharge chute 60 receives and discharges the articles A that the grippers 30 have released. The control unit 70 controls the operation of the various configurations of the article discharge system 100, such as the placement unit drive unit 54, gripper drive units 34, and the robot 10, and performs combination calculations utilizing the weight values of the articles A that the weight acquisition units 40 have acquired.

Figure 3:
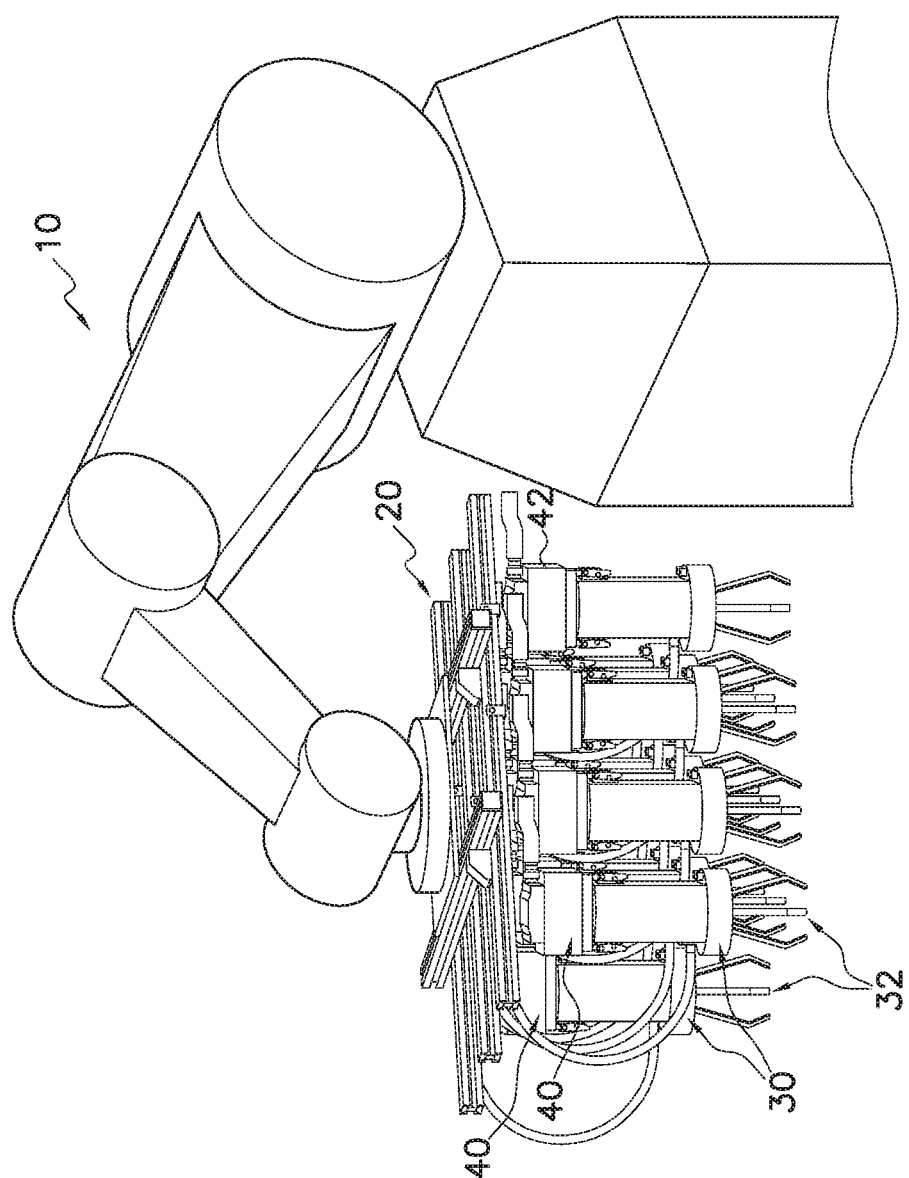
FIG. 3 is a general perspective view of a robot, a movable member, weight acquisition units, and grippers of the article discharge system of FIG. 1.
Figure 4:
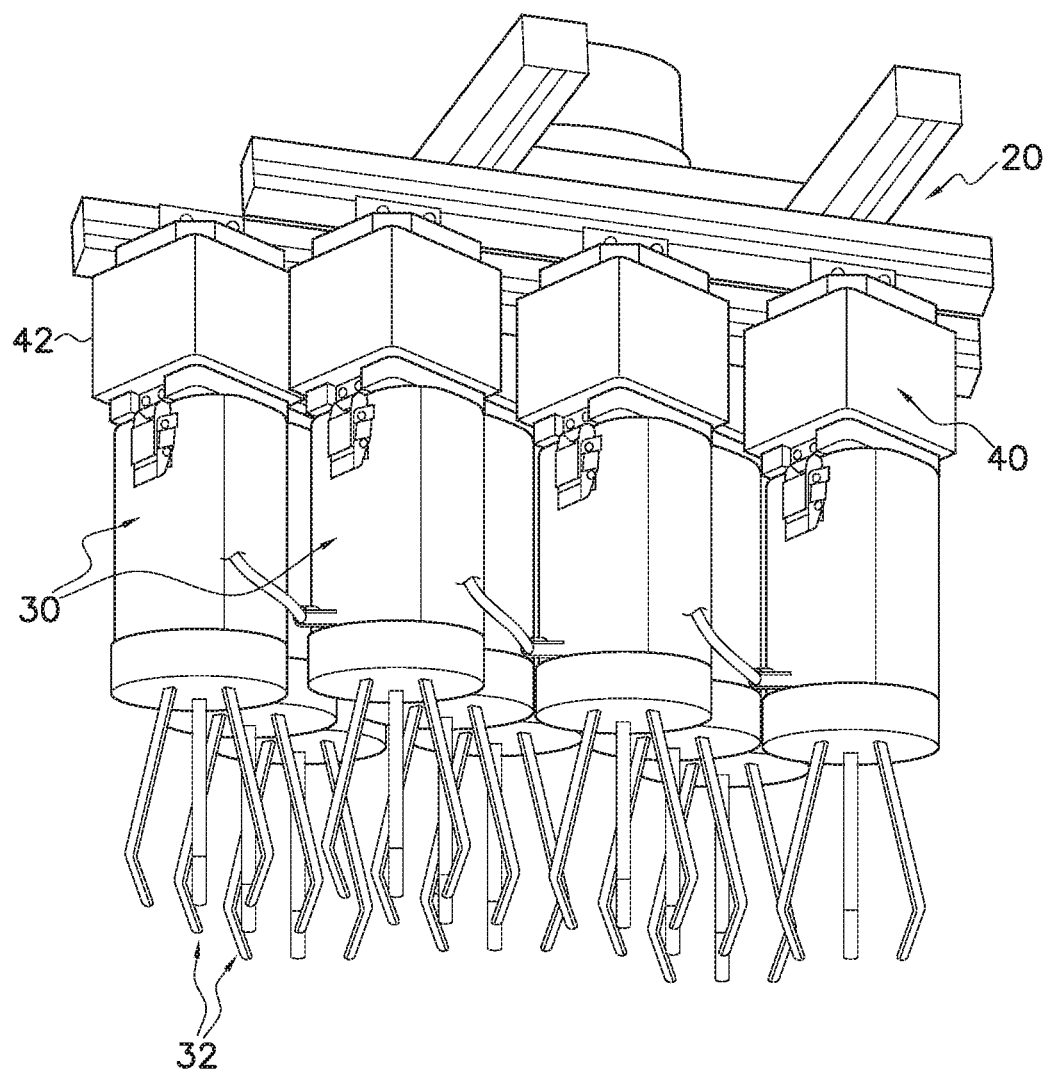
FIG. 4 is a general perspective view of the movable member, the weight acquisition units, and the grippers of the article discharge system of FIG. 1.
Figure 5:
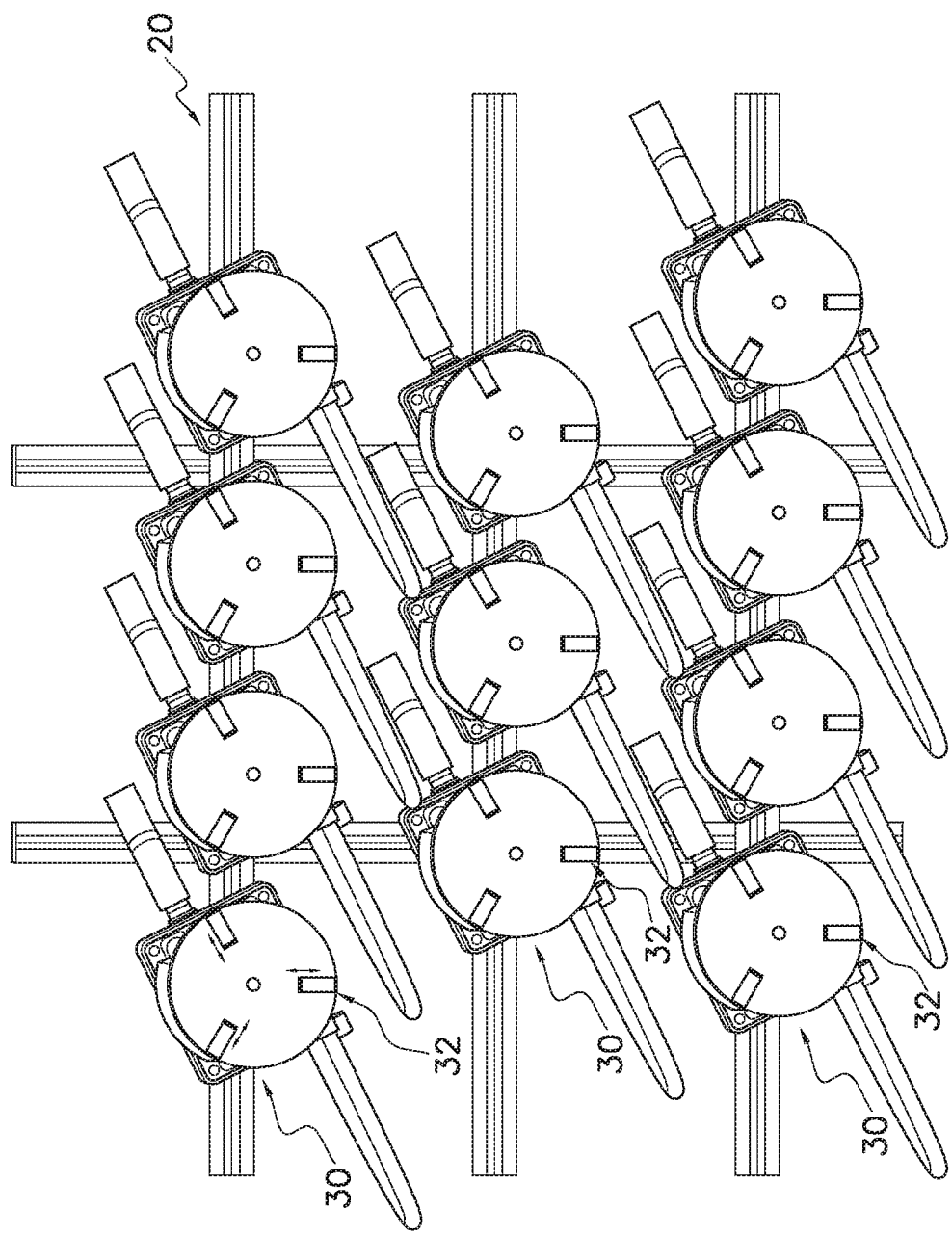
FIG. 5 is a bottom view, seen from a gripping member side of the grippers, of the movable member to which the grippers of the article discharge system of FIG. 1 are attached.

The operation of the article discharge system 100 will be generally described. The control unit 70 controls the operation of the robot 10 to move the movable member 20 and bring the plural grippers 30 closer to the placement unit 50 placed in the first position in which the article group A1 is placed. The control unit 70 controls the operation of the plural grippers 30 to cause each of the plural grippers 30 to grip some of the articles A of the article group A1 placed in the placement unit 50. The weight acquisition units 40 acquire the weight values of the articles A that each of the grippers 30 grips. The control unit 70 performs a combination calculation based on the weight values of the articles A that each of the grippers 30 grips and which the weight acquisition units 40 have acquired. The combination calculation is a process of adding together the weight values of the articles A that each of the grippers 30 grips to find a combination of weight values whose total value falls within a target weight range. On the basis of the result of the combination calculation, the control unit 70 causes the grippers 30 corresponding to the combination of weight values that fall within the target weight range to release the articles A above the discharge chute 60 and thereby discharge the articles A in the target weight range from the discharge chute 60. Details will be described later.
(2) Detailed Configuration The detailed configuration of the article discharge system 100 will be described mainly with reference to FIG. 1 to FIG. 5. FIG. 3 is a general perspective view of the robot 10, the movable member 20, the weight acquisition units 40, and the grippers 30. FIG. 4 is a general perspective view of the movable member 20, the weight acquisition units 40, and the grippers 30. FIG. 5 is a bottom view, seen from the gripping member 32 side of the grippers 30 (from below), of the movable member 20 to which the grippers 30 are attached.
(2-1) Movable Member The movable member 20 is a member to which the plural grippers 30 are attached. The movable member 20 is a frame that supports the plural grippers 30. The movable member 20 is a movable (capable of being moved) member that is moved by the robot 10.

It will be noted that, here, the statement "the plural grippers 30 are attached to the movable member 20" does not mean only a configuration where the plural grippers 30 are attached directly to the movable member 20. The statement "the plural grippers 30 are attached to the movable member 20" includes a configuration where the plural grippers 30 are attached via other members to the movable member 20. In the present embodiment, the plural grippers 30 are attached via sensor units 42 of the weight acquisition units 40 to the movable member 20 (see FIG. 4).
(2-2) Robot The robot 10 is an example of a first drive unit. The robot 10 is a device that supports the movable member 20 and moves the movable member 20. In the present embodiment, the robot 10 moves the movable member 20 along a single axis. Specifically, the robot 10 moves the movable member 20 up and down along a single axis extending in the vertical direction.

In the present embodiment, the robot 10 is a multi-joint robot such as shown in FIG. 1. However, the type of the robot 10 is not limited to a multi-joint robot. It suffices for the robot 10 to be a device that can move the movable member 20 in predetermined directions.

Furthermore, the first drive unit of the article discharge system 100 may also be a cylinder that can move the movable member 20 in predetermined directions. For example, the first drive unit of the article discharge system 100 may also be a cylinder that can move the movable member 20 along a single axis.

(2-3) Grippers

The grippers 30 are devices that grip the articles A.

The grippers 30 have the gripping members 32 and the gripper drive units 34. The gripper drive units 34 drive the gripping members 32 using, for example, a motor and/or fluid pressure as a drive source.

In the present embodiment, the gripping members 32 are rod-like or finger-like members (see FIG. 4). Each of the grippers 30 has a plurality (in FIG. 4, three) of the gripping members 32. It will be noted that the number and the shape of the gripping members 32 illustrated in FIG. 4 and other drawings are merely exemplary and can be appropriately changed. When each of the grippers 30 is viewed from the gripping member 32 side, the plural gripping members 32 are, in the present embodiment, arranged in the circumferential direction (see FIG. 5). In particular, here, when viewed from the gripping member 32 side of each of the grippers 30, the plural gripping members 32 are arranged generally equidistantly in the circumferential direction. When each of the grippers 30 is viewed from the gripping member 32 side, end portions of the gripping members 32 are movable in the radial direction (see FIG. 5). The grippers 30 pinch the articles A between the plural gripping members 32 and thereby grip the articles A by moving, with the gripper drive units 34, the gripping members 32 inward in the radial direction from a state in which they are away from each other to a state in which they are close to each other. Furthermore, the grippers 30 release the articles A by moving, with the gripper drive units 34, the gripping members 32 outward in the radial direction from a state in which they are close to each other to a state in which they are away from each other.

The plural grippers 30 are attached to the movable member 20 as in FIG. 3 to FIG. 5. The grippers 30 are each attached via the sensor units 42 of the weight acquisition units 40 to the movable member 20. In other words, the sensor units 42 of the weight acquisition units 40 are disposed between the grippers 30 and the movable member 20 that supports the grippers 30. Although this is not intended to limit the number of the grippers 30, in the example shown in FIG. 3 to FIG. 5 there are eleven grippers 30 attached to the movable member 20. The plural grippers 30 attached to the movable member 20 integrally move up and down as a result of the robot 10 moving the movable member 20 up and down.

The grippers 30 each have a substantially circular shape when the grippers 30 attached to the movable member 20 are viewed from the gripping member 32 side (see FIG. 5). Furthermore, in the present embodiment, the grippers 30 each have a substantially circular gripping area GA when the grippers 30 attached to the movable member 20 are viewed from the gripping member 32 side (see FIG. 7A to FIG. 7C). The gripping areas GA are areas in which the gripping members 32 of the grippers 30 can grip the articles A.

Although this is not intended to limit their arrangement, when the plural grippers 30 attached to the movable member 20 are viewed from the gripping member 32 side (in the present embodiment, from below), the plural grippers 30 are arranged in a staggered manner as in FIG. 5. By arranging the grippers 30 in this way, it is easy to arrange a large number of the grippers 30 in a relatively small surface area when the plural grippers 30 attached to the movable member 20 are viewed from the gripping member 32 side. This will be specifically described with reference to FIG. 6.

Figure 6:
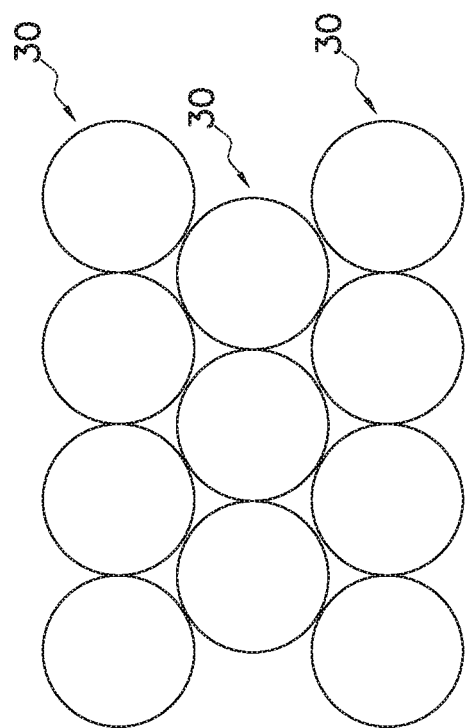
FIG. 6 is a diagram comparatively showing a case where the grippers are arranged in a grid-like manner in the movable member and a case where the grippers are arranged in a staggered manner in the movable member.
Figure 6:
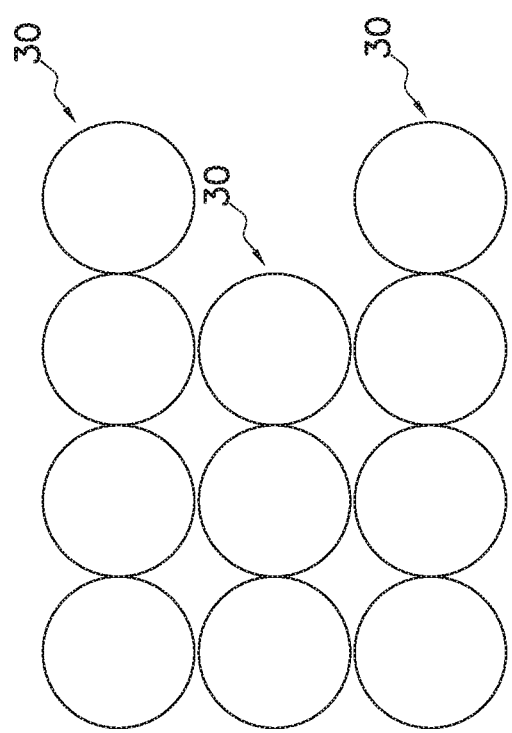

FIG. 6 illustrates a case where the eleven grippers 30 are arranged in three rows in a grid-like manner and a case where the eleven grippers 30 are arranged in three rows in a staggered manner. In FIG. 6, arrangements of the grippers 30 when the grippers 30 are brought as close to each other as possible (when the grippers 30 are adjacent to each other) are illustrated. As will be understood from FIG. 6, in the case where the grippers 30 are arranged in a staggered manner, the grippers 30 can be arranged more compactly compared to the case where the grippers 30 are arranged in a grid-like manner. In the example of FIG. 6, by changing the arrangement of the grippers 30 from the grid arrangement to the staggered arrangement, the width of the grippers 30 in the direction in which the rows of the grippers 30 are arranged (the up and down direction in FIG. 6) can be reduced without changing the length of the arrangement of the grippers 30 in the direction in which the grippers 30 are arranged in each row (the right and left direction in FIG. 6).

Furthermore, it is preferred that the plural grippers 30 be attached to the movable member 20 in such a way that, as in FIG. 7A, the gripping areas GA in which each of the grippers 30 can grip the articles A in the placement unit 50 are in proximity to a gripping area GA in which at least one other gripper 30 can grip the articles A in the placement unit 50. It will be noted that FIG. 7A illustrates the gripping areas GA in which each of the grippers 30 can grip the articles A in the placement unit 50 when the placement unit 50 is viewed from above.

Figure 7C:
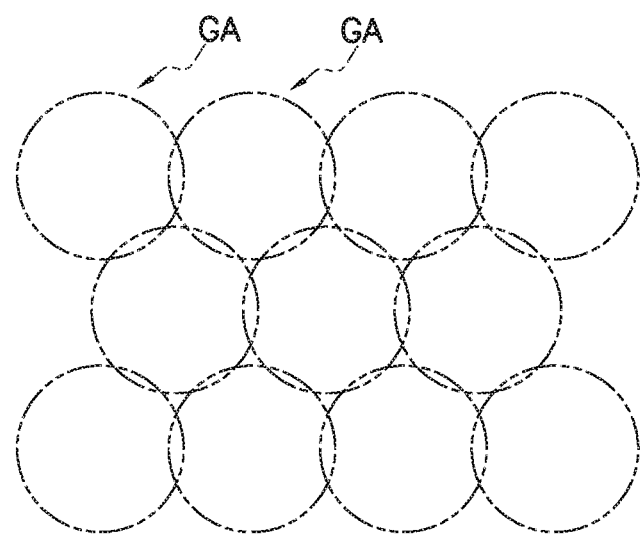
FIG. 7C is a plan view schematically showing another example of an arrangement pattern of the gripping areas of the plural grippers.

More preferably, to the extent that the gripping members 32 of adjacent grippers 30 do not interfere with each other, the plural grippers 30 are attached to the movable member 20 in such a way that, as in FIG. 7B, the gripping areas GA in which each of the grippers 30 can grip the articles A in the placement unit 50 are contiguous with a gripping area GA in which at least one other gripper 30 can grip the articles A in the placement unit 50. Furthermore, to the extent that the gripping members 32 of adjacent grippers 30 do not interfere with each other, the plural grippers 30 may also be attached to the movable member 20 in such a way that, as in FIG. 7C, the gripping areas GA in which each of the grippers 30 can grip the articles A in the placement unit 50 partially overlap a gripping area GA in which at least one other gripper 30 can grip the articles A in the placement unit 50.

(2-4) Weight Acquisition Units

In the article discharge system 100, one weight acquisition unit 40 is provided to each of the grippers 30. The weight acquisition units 40 are an example of weight acquisition units and measure the weights of the articles A for the corresponding grippers 30 grip.

Each weight acquisition unit 40 mainly includes a sensor unit 42 and a control unit (not shown in the drawings).

The grippers 30 are attached via the sensor units 42 to the movable member 20 as in FIG. 4. The sensor units 42 include a force sensor and an acceleration sensor (not shown in the drawings). Although this is not intended to limit the types of the sensors, the force sensor is, for example, a strain gauge load cell. The acceleration sensor is, for example, a strain gauge load cell or a MEMS small acceleration sensor.

The control units of the weight acquisition units 40 acquire the masses of the articles A that the grippers 30 are gripping on the basis of the force and the acceleration measured by the sensor units 42 when the grippers 30 gripping the articles A are moved in accompaniment with the movement of the movable member 20. Specifically, the control units of the weight acquisition units 40 acquire the masses of the articles A that the grippers 30 are gripping by dividing the force measured by the force sensor by the acceleration measured by the acceleration sensor.

It will be noted that the weight acquisition units are not limited to the weight acquisition units 40 that acquire the masses of the articles A on the basis of the force and the acceleration that are measured when the grippers 30 move. The weight acquisition units may also be units that use load cells or the like to acquire the weights of the articles that the grippers 30 in a stationary state grips.

(2-5) Placement Unit and Placement Unit Drive Unit

The article group A1 is placed in the placement unit 50.

Specifically, the placement unit 50 includes an article group holding container 52. The articles A (the article group A1) are held in the article group holding container 52. In the placement unit 50, the article group A1 is placed on a placement surface 52a (here, the bottom surface of the article group holding container 52). The grippers 30 grip some of the articles A from the article group A1 held in the article group holding container 52. In the present embodiment, the article group holding container 52 is a cuboidal container with an open top. In the present embodiment, the placement unit 50 is configured in such a way that, when the quantity of the articles A held inside the article group holding container 52 decreases, a person or a machine can replace the article group holding container 52 in which the quantity of the articles A inside has decreased with an article group holding container 52 that is new (in which many articles A are held). It will be noted that instead of being configured in such a way that the article group holding container 52 can be replaced, the placement unit 50 may have an article supply mechanism for supplying the articles A to the article group holding container 52.

The placement unit 50 is moved between a first position and a second position by the placement unit drive unit 54. The placement unit drive unit 54 moves the placement unit 50 using, for example, a motor and/or fluid pressure as a drive source. The first position is a position in which the grippers 30 can grip the articles A of the article group A1 placed in the placement unit 50. The second position is a position in which the grippers 30 cannot grip the articles A from the article group A1 placed in the placement unit 50. The placement unit drive unit 54 moves the placement unit 50 in a direction intersecting the moving direction of the movable member 20 between the first position and the second position. In other words, the placement unit drive unit 54 moves the placement unit 50 in a direction intersecting the vertical direction between the first position and the second position. Although this is not intended to be limiting, in the present embodiment, the placement unit drive unit 54 moves the placement unit 50 in the horizontal direction between the first position and the second position.

The first position of the placement unit 50 specifically is a position directly under the grippers 30. When the placement unit 50 is in the first position, the grippers 30 can grip the articles A placed in the placement unit 50 when the robot 10 moves the movable member 20 so that the grippers 30 are brought closer to a predetermined position with respect to the placement unit 50. Furthermore, the first position of the placement unit 50 is a position directly above the discharge chute 60.

The second position of the placement unit 50 is a position away from directly under the grippers 30. In the present embodiment, the movable member 20 to which the grippers 30 are attached moves only in the vertical direction. Therefore, when the placement unit 50 is in the second position, the grippers 30 cannot grip the articles A placed in the placement unit 50. Furthermore, the second position of the placement unit 50 is a position away from directly above the discharge chute 60.

(2-6) Discharge Chute

The discharge chute 60 is a funnel-shaped member. The discharge chute 60 is disposed directly under the grippers 30. Furthermore, the discharge chute 60 is disposed directly under the placement unit 50 when the placement unit 50 is positioned in the first position. In other words, the placement unit 50 positioned in the first position is disposed between the grippers 30 and the discharge chute 60. When the placement unit 50 is positioned in the second position, the placement unit 50 is not disposed between the grippers 30 and the discharge chute 60.

The discharge chute 60 discharges, to the outside of the article discharge system 100, the articles A supplied from the grippers 30 as a result of the grippers 30 releasing the articles A. Specifically, when the placement unit 50 is positioned in the second position, the discharge chute 60 receives, and discharges to the outside of the article discharge system 100, the articles A that the grippers 30 drop therein by releasing the articles A.

(2-7) Control Unit

The control unit 70 has a CPU and memories such as a ROM and a RAM (not shown in the drawings). The control unit 70 is electrically connected to the robot 10, the gripper drive units 34, the weight acquisition units 40, and the placement unit drive unit 54 (see FIG. 2). The control unit 70, as a result of the CPU executing a program stored in the memory, controls the operation of the various configurations of the article discharge system 100, such as the robot 10, the gripper drive units 34, and the placement unit drive unit 54, and performs combination calculations utilizing the weight values of the articles A that the weight acquisition units 40 have acquired. It will be noted that the various functions of the control unit 70 are not limited to a case where they are realized by software and may also be realized by hardware or by hardware and software working together.

(2-7-1) Operation of Article Discharge System

The operation of the article discharge system 100 controlled by the control unit 70 will be described with reference to FIG. 8A to FIG. 8G. It will be noted that FIG. 8A to FIG. 8G are schematic side views of main portions of the article discharge system for describing the operation of the article discharge system 100 of FIG. 1. In FIG. 8A to FIG. 8G, illustration of the robot 10 that moves the movable member 20 is omitted.

FIG. 8A illustrates an initial state before the grippers 30 grip the articles A. To briefly describe the states of the various devices in the initial state, the movable member 20 is disposed in a predetermined position so that the gripping members 32 of the grippers 30 are disposed outside the article group holding container 52 of the placement unit 50. The placement unit 50 is disposed in the first position directly under the grippers 30.

When the article discharge system 100 is operating, the control unit 70 controls the robot 10 to move the movable member 20 vertically downward from the initial state and bring the plural grippers 30 closer to the placement unit 50. Specifically, the control unit 70 controls the operation of the robot 10 to move the movable member 20 vertically downward so that the gripping members 32 of the grippers 30 are disposed in the predetermined position in which they can grip the articles A in the article group holding container 52 (see FIG. 8B). More specifically, the control unit 70 controls the operation of the robot 10 to move the movable member 20 vertically downward so that the gripping members 32 become inserted into the article group A1. Thereafter, the control unit 70 controls the gripper drive units 34 of the grippers 30 to cause the gripping members 32 to grip the articles A.

Preferably, the control unit 70 causes the plural grippers 30 to grip the articles A simultaneously. However, the control unit 70 is not limited to this and may also cause the plural grippers 30 to grip the articles A at different timings.

Figure 8C:
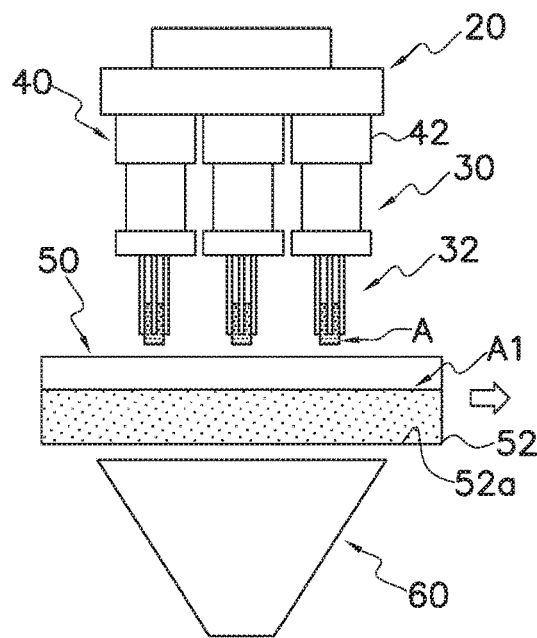
FIG. 8C is a general side view of main portions of the article discharge system for describing the operation of the article discharge system of FIG. 1, and illustrates a state in which the gripping members of the grippers that have gripped the articles have moved outside an article group holding container.

Next, in a state in which the plural grippers 30 are gripping the articles A, the control unit 70 controls the robot 10 to move the movable member 20 vertically upward so that the gripping members 32 of the grippers 30 are disposed outside the article group holding container 52 of the placement unit 50 (see FIG. 8C).

Figure 8D:
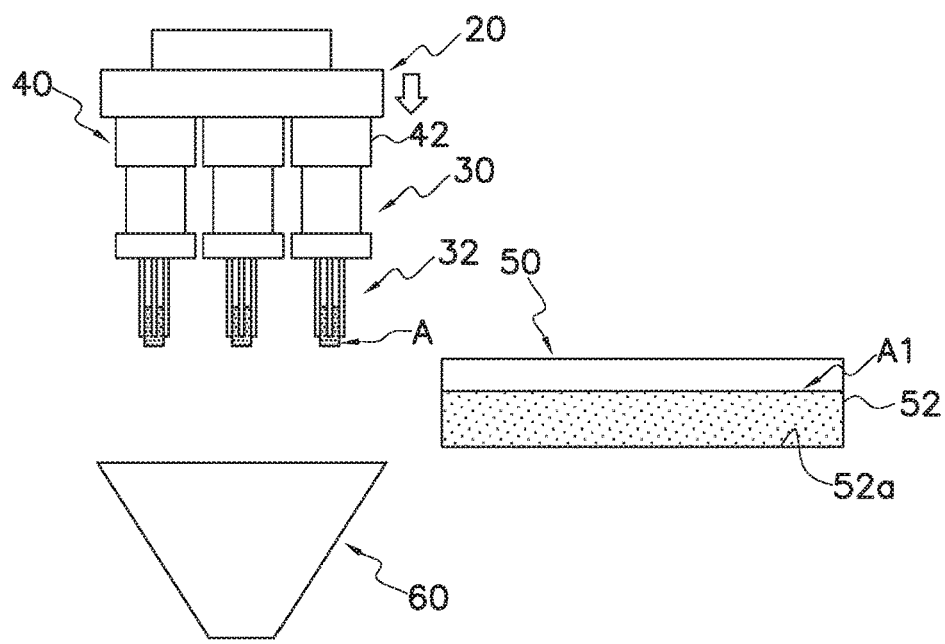
FIG. 8D is a general side view of main portions of the article discharge system for describing the operation of the article discharge system of FIG. 1, and illustrates a state in which a placement unit has moved to a second position.

Next, the control unit 70 controls the placement unit drive unit 54 to move the placement unit 50 from the first position to the second position (see FIG. 8D). When the placement unit 50 moves to the second position, the placement unit 50 is no longer disposed between the grippers 30 and the discharge chute 60.

Figure 8E:
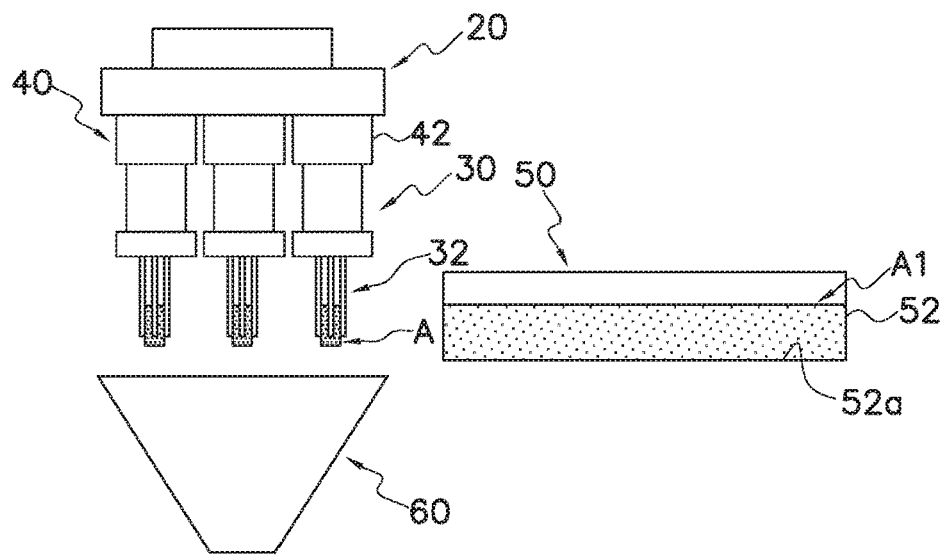
FIG. 8E is a general side view of main portions of the article discharge system for describing the operation of the article discharge system of FIG. 1, and illustrates a state in which the grippers have moved to the vicinity of a chute to discharge the articles.

Next, the control unit 70 controls the robot 10 to move the movable member 20 vertically downward and bring the plural grippers 30 closer to the discharge chute 60 (see FIG. 8E). When the robot 10 moves the movable member 20 vertically downward, the weight acquisition units 40 acquire the weights of the articles A that the corresponding grippers 30 grip. The control unit 70 performs a combination calculation using the weight values of the articles A that the grippers 30 grip and which the weight acquisition units 40 have acquired and finds a combination of weight values whose total value falls within the target weight range.

Figure 8F:
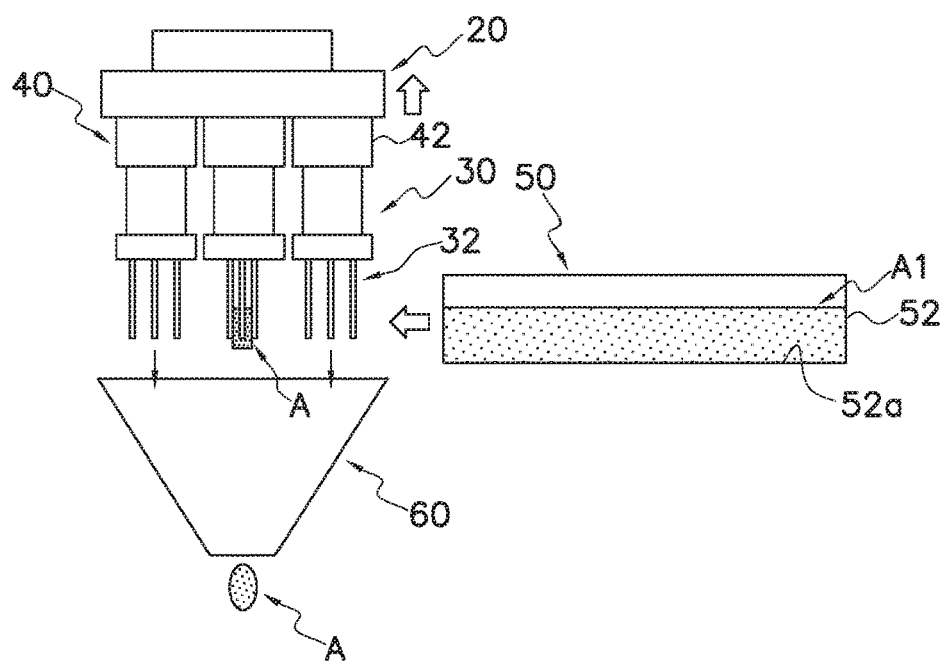
FIG. 8F is a general side view of main portions of the article discharge system for describing the operation of the article discharge system of FIG. 1, and illustrates a state in which some of the grippers have dropped the articles into the chute.
Figure 8G:
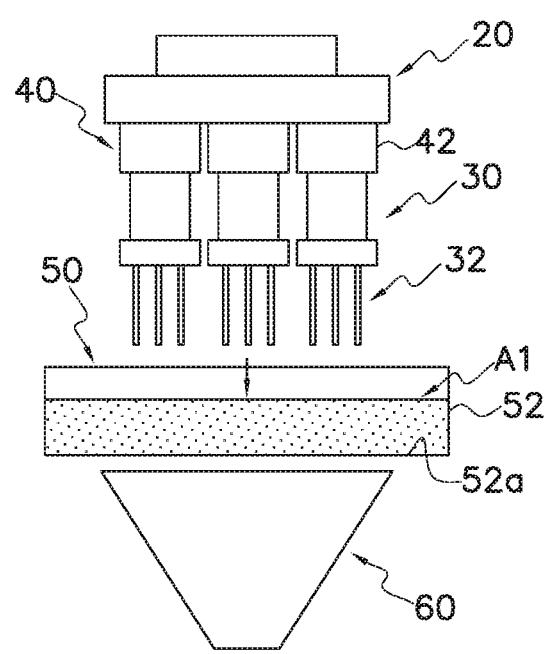
FIG. 8G is a general side view of main portions of the article discharge system for describing the operation of the article discharge system of FIG. 1, and illustrates a state in which a gripper corresponding to a weight value that is not selected for a combination has dropped the articles into the article group holding container.

When the combination calculation ends, on the basis of the result of the combination calculation the control unit 70 causes the grippers 30 corresponding to the combination of weight values falling within the target weight range to release the articles A above the discharge chute 60 and thereby discharge the articles A from the discharge chute 60 (see FIG. 8F). In a case where there is more than one combination of weight values falling within the target weight range, the control unit 70 may execute the discharge of the articles A from the discharge chute 60 multiple times.

When the discharge of the articles A ends with respect to all combinations of weight values falling within the target weight range, the control unit 70 controls the robot 10 to return the movable member 20 to the same position as the position illustrated in FIG. 8A. Furthermore, the control unit 70 controls the placement unit drive unit 54 to return the placement unit 50 from the second position to the first position directly under the grippers 30 (see FIG. 8G). Moreover, if there are grippers 30 that are still gripping the articles A (in other words, if there are grippers 30 where the weight values of the articles A they are gripping were not selected for a combination), the control unit 70 controls the gripper drive units 34 to cause those grippers 30 to release the articles A. As a result, the articles A that the grippers 30 had been gripping drop into the placement unit 50 disposed in the first position and are reused as the articles A of the article group A1.

The article discharge system 100 repeatedly performs the above operations.

It will be noted that the operations of the article discharge system 100 described here are merely an example and can be appropriately changed to the extent that they are not incompatible.

For example, in the above description, the weight acquisition units 40 acquire, at the timing when the movable member 20 is moved vertically downward, the weights of the articles A that the grippers 30 grip. Instead of this, the weight acquisition units 40 may acquire, at the timing when the movable member 20 is moved vertically upward, the weights of the articles A that the corresponding grippers 30 grip.

Furthermore, for example, when controlling the robot 10 to move the movable member 20 upward in a state in which the plural grippers 30 are gripping the articles A (when changing the position of the movable member 20 from the position illustrated in FIG. 8B to the position illustrated in FIG. 8C) the control unit 70 may control the robot 10 to move the movable member 20 downward one or more times before moving the placement unit 50 from the first position to the second position. Specifically, the control unit 70 may control the robot 10 to move the movable member 20 a predetermined distance downward one time before moving the placement unit 50 from the first position to the second position after having moved the movable member 20 upward. Furthermore, for example, the control unit 70 may control the robot 10 to reciprocally move the movable member 20 in upward and downward directions before moving the placement unit 50 from the first position to the second position after having moved the movable member 20 upward. Such operations of the movable member 20 can shake off articles sticking to the gripping members 32. Articles sticking to the gripping members 32 are articles that are not gripped by the gripping members 32 and for which there is a concern that they will drop regardless of the operation of the gripping members 32. By moving the movable member 20 downward to shake off beforehand articles sticking to the gripping members 32, the weights of the articles A that the weight acquisition units 40 acquire can be brought closer to the weights of the articles A that the gripping members 32 are gripping to thereby improve measurement accuracy.

(3) Characteristics (3-1)

The article discharge system 100 of the present embodiment pulls out some of the articles A from the article group A1 and discharges them. The article discharge system 100 includes the placement unit 50, the plural grippers 30, the movable member 20, the robot 10 serving as an example of the first drive unit, the weight acquisition units 40, and the control unit 70. The article group A1 is placed in the placement unit 50. The plural grippers 30 grip, with the gripping members 32, the articles A. The plural grippers 30 are attached to the movable member 20. The robot 10 moves the movable member 20. The weight acquisition units 40 acquire the weight values of the articles A that each of the grippers 30 grips. The control unit 70 moves the movable member 20, brings the plural grippers 30 closer to the placement unit 50, causes the plural grippers 30 to grip some of the articles A of the article group A1 placed in the placement unit 50, and, based on the result of a combination calculation using the weight values of the articles A that each of the grippers 30 grips and which the weight acquisition units 40 have acquired, causes predetermined grippers 30 among the plural grippers 30 to release the articles A and thereby discharge the articles A.

In the article discharge system 100 of the present embodiment, the grippers 30 are not attached to respectively different movable members 20; rather, the plural grippers 30 are attached to the movable member 20, so it is possible to make the article discharge system 100 compact.

Furthermore, by providing the plural grippers 30 in the single movable member 20, the number of drive units for moving the grippers 30 closer to the placement unit 50 can be reduced in contrast to a case where a single gripper 30 is provided in the movable member 20.

(3-2)

In the article discharge system 100 of the present embodiment, the plural grippers 30 are arranged in a staggered manner when the plural grippers 30 are viewed from the gripping member 32 side. In other words, in the article discharge system 100, the plural grippers 30 are arranged in a staggered manner when the plural grippers 30 attached to the movable member 20 are viewed from below.

In the article discharge system 100 of the present embodiment, the grippers 30 are arranged in a staggered manner when viewed from the gripping member 32 side, so a large number of the grippers 30 can be arranged in a small space and it is easy to make the article discharge system 100 compact.

It will be noted that by compactly arranging the grippers 30 in a staggered manner, the following advantages are also obtained in addition to making the article discharge system 100 compact.

By compactly arranging the grippers 30 in a staggered manner, the opening in the upper end of the discharge chute 60 (the opening on the side where the articles A that the grippers 30 drop are input) can be made relatively small. For that reason, under a condition where the height of the discharge chute 60 and the size of the opening (the discharge outlet for the articles A) in the lower portion of the discharge chute 60 are identical, when the grippers 30 are compactly arranged in a staggered manner, the angle of the side surface of the funnel-shaped discharge chute 60 can be made steeper compared to a case where the grippers 30 are arranged in a way other than a staggered manner. For that reason, by compactly arranging the grippers 30 in a staggered manner, it is easier to reduce the articles A sticking to the side surface of the discharge chute 60, even when the articles A are articles that are relatively sticky, and the occurrence of discrepancies between the weight of the articles A that have been input to the discharge chute 60 and the weight of the articles A that are discharged from the discharge chute 60 is easily reduced.

(3-3)

In the article discharge system 100 of the present embodiment, the gripping area GA in which each of the grippers 30 can grip the articles A in the placement unit 50 is in proximity to a gripping area GA in which at least one other gripper 30 can grip the articles A in the placement unit 50. Alternatively, the gripping area GA in which each of the grippers 30 can grip the articles A in the placement unit 50 partially overlaps a gripping area GA in which at least one other gripper 30 can grip the articles A in the placement unit 50.

In the article discharge system 100 of the present embodiment, the gripping area GA of certain gripper 30 is adjacent to or overlaps the gripping area GA of at least one other gripper 30, so a large number of the grippers 30 can be arranged in a small space and it is easy to make the article discharge system 100 compact.

(3-4)

The article discharge system 100 of the present embodiment includes the discharge chute 60 and the placement unit drive unit 54 serving as an example of a second drive unit. The discharge chute 60 is disposed directly under the grippers 30. The discharge chute 60 receives and discharges the articles that the grippers 30 have released. The placement unit drive unit 54 moves the placement unit 50. The robot 10 moves the movable member 20 in the vertical direction. The placement unit drive unit 54 moves, in a direction intersecting the vertical direction, the placement unit 50 between the first position directly under the grippers 30 and the second position away from directly under the grippers 30.

In the article discharge system 100 of the present embodiment, the movable member 20 moves in the vertical direction, so a force in the horizontal direction is less likely to act on the articles A that the grippers 30 grip. For that reason, the occurrence of a problem where the articles A that the grippers 30 grip unintentionally drop is easily reduced. For that reason, in this article discharge system 100, it is easy to accurately discharge the articles A with the target weight.

Furthermore, in this article discharge system 100, the discharge chute 60 is disposed directly under the grippers 30, and the placement unit 50 is configured to be movable between the first position directly under the grippers 30 and the second position away from directly under the grippers 30. For that reason, in this article discharge system 100, the articles A that the grippers 30 grip can be supplied directly to the discharge chute 60 without moving the grippers 30 in the horizontal direction. Therefore, the potential for the articles A to stick to a member other than the grippers 30 and the discharge chute 60 can be reduced, and the risk that the articles A will stick to system components can be reduced to thereby improve the cleanliness of the system.

Second Embodiment

Figure 9:
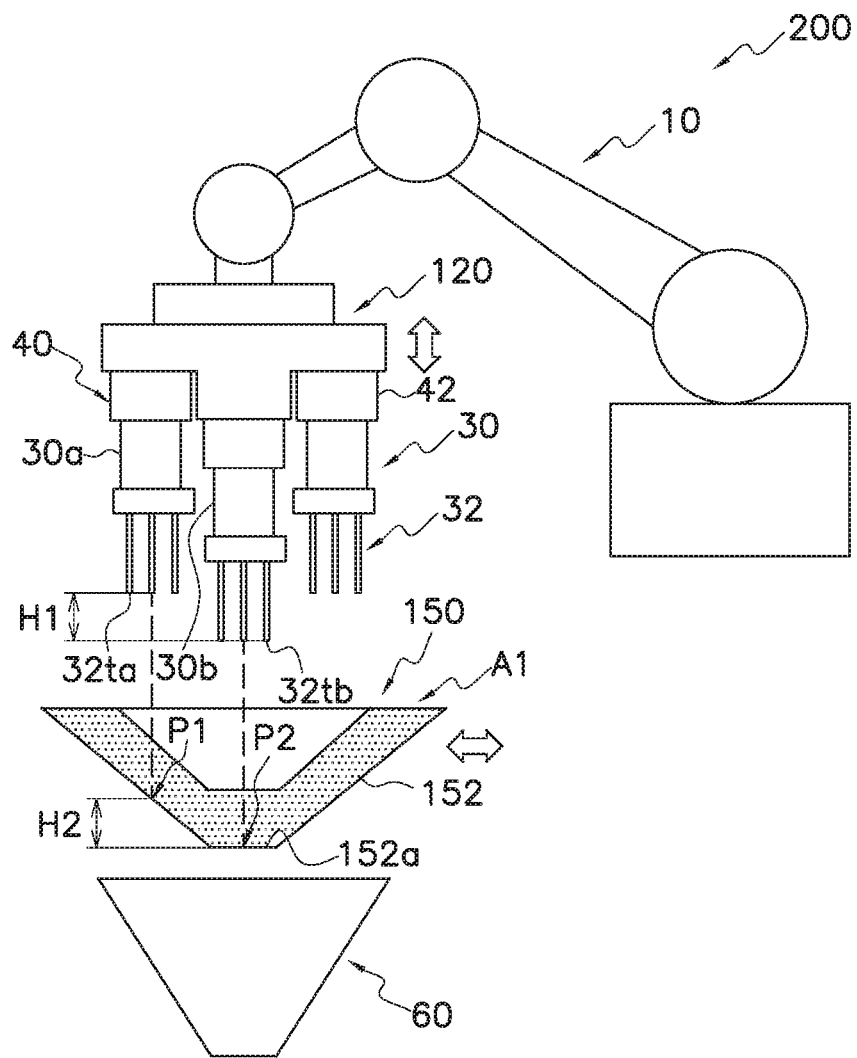
FIG. 9 is a schematic view of an article discharge system pertaining to a second embodiment of the invention.

An article discharge system 200 pertaining to a second embodiment of the invention will be described with reference to FIG. 9. FIG. 9 is a schematic view of the article discharge system 200. In FIG. 9, configurations that are similar to those of the article discharge system 100 of the first embodiment are assigned the same reference numerals as those of the first embodiment.

The article discharge system 200 is similar to the article discharge system 100 of the first embodiment except for the shape of an article group holding container 152 of a placement unit 150 and the arrangement of the grippers 30 (the positions of the lower ends of the gripping members 32). To avoid redundant description, here, points of differences between the article discharge system 200 and the article discharge system 100 will mainly be described and, unless it is particularly needed, description of points shared in common will be omitted.

It will be noted that here, to simplify description, a case where the article discharge system 200 has three grippers 30 will be described as an example. However, the number of the grippers 30 is not limited to three. The article discharge system 200 may also have more grippers 30, and the characteristics of the arrangement of the grippers 30 (the positions of the lower ends of the gripping members 32) described here can also be applied to more than three grippers 30.

The article group holding container 52 of the article discharge system 100 of the first embodiment is a cuboidal container, and the placement surface 52a (the bottom surface of the article group holding container 52) on which the article group A1 is placed is a level surface (see FIG. 1). In contrast, a placement surface 152a of the placement unit 150—in other words, the bottom surface of the article group holding container 152—of the present embodiment is configured in such a way that the height position of the placement surface 152a changes along the direction in which the three grippers 30 are arranged. Specifically, when the article group holding container 152 is cut along the direction in which the three grippers 30 are arranged, the bottom surface of the article group holding container 152 is formed substantially in V-shape. It will be noted that the advantage of giving the article group holding container 152 this kind of shape is that, when pulling out the articles A near the central portion of the article group holding container 152, the articles A at the peripheral edge portions of the article group holding container 152 move to the central portion, and a state in which there are no articles A in the positions where the grippers 30 grip the articles A is easily reduced.

In conformity with the configuration as in FIG. 9 where the height position of the placement surface 152a differs depending on the position of the article group holding container 152, in the article discharge system 200 of the present embodiment, the arrangement of the grippers 30 (the positions of the lower ends of the gripping members 32) differs in the following way from that in the article discharge system 100 of the first embodiment. Here, the arrangement of the grippers 30 in the article discharge system 200 will be described taking as an example particularly two grippers, a gripper 30a and a gripper 30b, in FIG. 9.

The gripper 30a and the gripper 30b are identical to each other in structure and function.

However, in a movable member 120 to which the gripper 30a and the gripper 30b are attached, the heights of the places where the grippers 30 are attached differ depending on the position in the movable member 120. Specifically, the height of the place where the gripper 30a is attached to the movable member 120 is higher than the height of the place where the gripper 30b is attached to the movable member 120. More specifically, the height of the place where the sensor portion 42 of the weight acquisition unit 40 corresponding to the gripper 30a is attached to the movable member 120 is higher than the height of the place where the sensor portion 42 of the weight acquisition unit 40 corresponding to the gripper 30b is attached to the movable member 120.

When the movable member 120 is brought closer to the placement unit 150 by the robot 10, the gripper 30a grips the articles A placed on a first portion P1 of the placement surface 152a of the placement unit 150. At the same time, when the movable member 120 is brought closer to the placement unit 150 by the robot 10, the gripper 30b grips the articles A placed on a second portion P2 of the placement surface 152a of the placement unit 150. As shown in FIG. 9, the first portion P1 of the placement surface 152a is disposed in a higher position than the second portion P2 of the placement surface 152a.

At this time, let it be assumed that, in a state in which the movable member 120 is stationary, the position of the lower end of the gripping members 32 of the gripper 30a and the position of the lower end of the gripping members 32 of the gripper 30b are disposed in the same height position. In this case, at the height position where it is easy for the gripper 30a to grip the articles A, there is the potential for the lower end of the gripping members 32 of the gripper 30b does not reach the article group A1. Conversely, at the height position where it is easy for the gripper 30b to grip the articles A, there is the potential for the gripping members 32 of the gripper 30a to be inserted too much into the article group A1 and/or for the lower ends of the gripping members 32 of the gripper 30a to contact the placement surface 152a.

Thus, here, in the movable member 120, lower end 32ta of the gripping members 32 of the gripper 30a is disposed in a higher position than lower end 32tb of the gripping members 32 of the gripper 30b.

Preferably, a difference H1 between the height positions of the lower end 32ta of the gripping members 32 of the gripper 30a and the lower end 32tb of the gripping members 32 of the gripper 30b in the movable member 120 is designed to be identical to a difference H2 between the height positions of the first portion P1 of the placement surface 152a and the second portion P2 of the placement surface 152a. It will be noted that here the first portion P1 of the placement surface 152a slopes such that the height of the placement surface 152a on which there are articles A that is to be gripped by the gripper 30a is not uniform, so a representative value representing the height of the placement surface 152a (e.g., an average value or a median value of the height of the placement surface 152a at the first portion P1) can be regarded as the height of the first portion P1 of the placement surface 152a. Because the arrangement of the grippers 30 (the positions of the lower ends of the gripping members 32) is configured in this way, namely, by disposing the positions of the lower ends of the gripping members 32 so as to follow the placement surface 152a of the placement unit 150, the gripping members 32 of the grippers 30 can be inserted into the article group A1 generally evenly and large variations in the weights of the articles A that each of the grippers 30 grips are less likely to arise.

It will be noted that the method of making different the height position of the lower end 32ta of the gripping members 32 of the gripper 30a and the height position of the lower end 32tb of the gripping members 32 of the gripper 30b is not limited to varying the heights of the places where the gripper 30a and the gripper 30b are attached to the movable member 120. For example, a method such as changing the lengths of the gripping members 32 between the gripper 30a and the gripper 30b may also be employed. However, from the standpoint of standardizing the grippers 30, it is preferred that the lengths of the gripping members 32 be made uniform.

(1) Characteristics

The article discharge system 200 of the second embodiment has the following characteristics in addition to the characteristics of the article discharge system 100 of the first embodiment.

(1-1)

In the article discharge system 200 of the present embodiment, the control unit 70 moves the movable member 120 at least downward from a predetermined position (see FIG. 8A and FIG. 8B of the first embodiment) to bring the plural grippers 30 closer to the placement unit 150 when the grippers 30 are to grip the articles A in the placement unit 50. The placement unit 150 has the placement surface 152a on which the article group A1 is placed. The plural grippers 30 include at least the first gripper 30a and the second gripper 30b. The first portion P1 of the placement surface 152a on which are placed the articles that the first gripper 30a grips is disposed in a higher position than the second portion P2 of the placement surface 152a on which are placed the articles that the second gripper 30b grips. In the movable member 120, the lower end 32ta of the gripping members 32 of the first gripper 30a is disposed in a higher position than the lower end 32tb of the gripping members 32 of the second gripper 30b. In other words, in a state in which the position of the movable member 120 is stationary, the lower end 32ta of the gripping members 32 of the first gripper 30a is disposed in a higher position than the lower end 32tb of the gripping members 32 of the second gripper 30b.

In this article discharge system 200, the height positions of the lower ends of the gripping members 32 of the grippers 30 change in accordance with the height position of the placement surface 152a on which are placed the articles A that the grippers 30 grip. For that reason, it is easy for each of the plural grippers 30 provided in the same movable member 120 to take an appropriate quantity of the articles A from the placement unit 150 whose placement surface 152*a* is not level.

(1-2)

In the article discharge system 200 of the present embodiment, the difference H1 between the height position of the lower ends 32*ta* of the gripping members 32 of the first gripper 30*a* and the lower end 32*tb* of the gripping members 32 of the second gripper 30*b* in the movable member 120 is identical to the difference H2 between the height positions of the first portion P1 of the placement surface 152*a* of the placement unit 150 and the second portion P2 of the placement surface 152*a*. In other words, in a state in which the position of the movable member 120 is stationary, the difference H1 between the height position of the lower end 32*ta* of the gripping members 32 of the first gripper 30*a* and the lower end 32*tb* of the gripping members 32 of the second gripper 30*b* is generally identical to the difference H2 between the height positions of the first portion P1 of the placement surface 152*a* and the second portion P2 of the placement surface 152*a*.

In the article discharge system 200 of the present embodiment, the distance between the placement surface 152*a* on which are placed the articles A that each of the grippers 30 grips and the lower end of the gripping members 32 of that gripper 30 is set identically. It is therefore easy for each of the plural grippers 30 provided in the same movable member 120 to take an appropriate quantity of the articles A from the placement unit 150 whose placement surface 152*a* is not level.

(2) Example Modification of Second Embodiment

Figure 10:
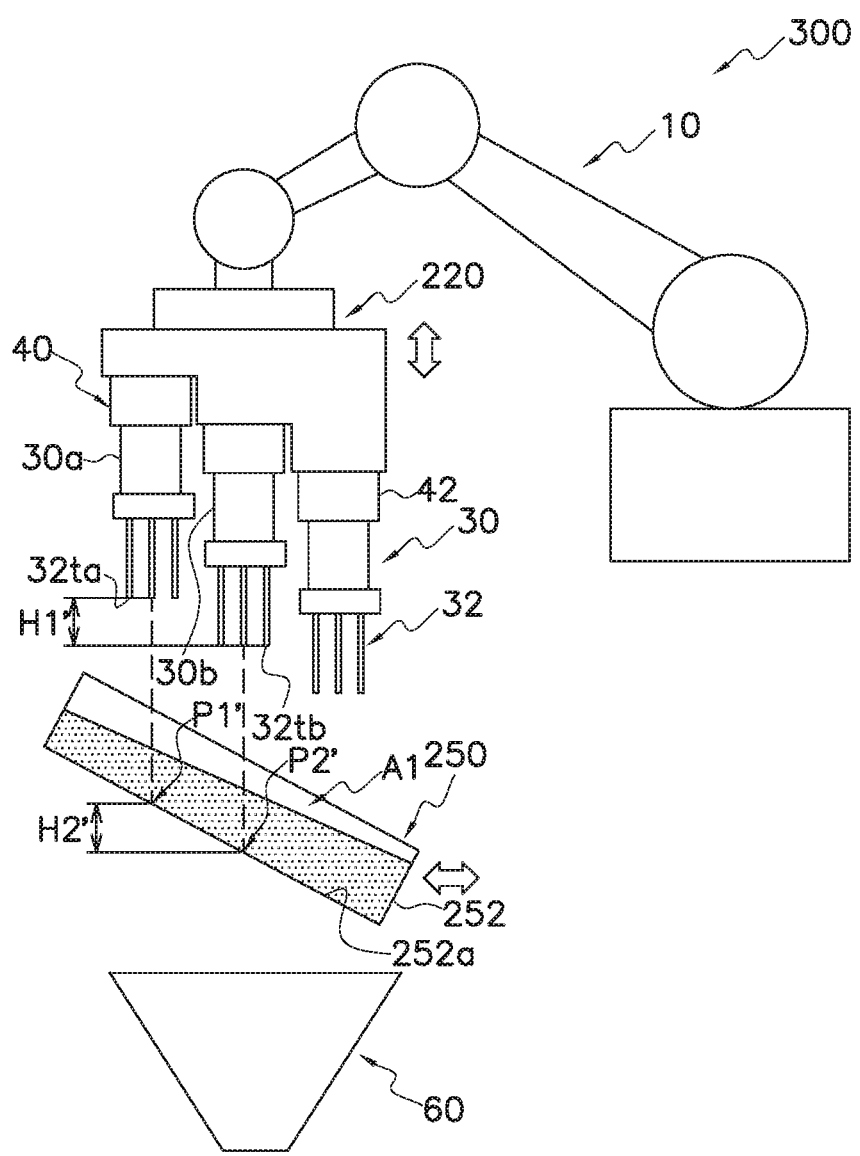
FIG. 10 is a schematic view of an article discharge system pertaining to an example modification of the second embodiment of the invention.

In the second embodiment, the article discharge system 200 in which the height positions of the placement surface 152*a* of the placement unit 150 change in the V-shape along the direction in which the three grippers 30 are arranged is described as an example. The arrangement of the grippers 30 can be designed with the same thought also in cases where the height position of the placement surface of the placement unit changes in ways other than in the V-shape. Here, an article placement system 300, where the way in which the height position of the placement surface of the placement unit changes is different from that of the article discharge system 200 of the second embodiment, will be described with reference to FIG. 10. FIG. 10 is a schematic view of the article discharge system 300. Here, configurations that are the same as those of the article discharge system 200 of the second embodiment are assigned the same reference signs as those of the second embodiment.

It will be noted that the article discharge system 300 is the same as the article discharge system 200 of the second embodiment except for the shape of an article group holding container 252 of a placement unit 250 and the arrangement of the grippers 30 (the positions of the lower ends of the gripping members). To avoid redundant description, here, points of differences between the article discharge system 300 and the article discharge system 200 will mainly be described and, unless it is particularly needed, description of points shared in common will be omitted.

The article group holding container 252 of the article discharge system 300 has a configuration where the cuboidal article group holding container 52 of the first embodiment is tilted. A placement surface 252*a* (the bottom surface of the article group holding container 252) on which the article group A1 is placed is a uniformly sloping surface (see FIG. 10).

In conformity with this configuration where the height position of the placement surface 252*a* differs depending on the position of the article group holding container 252, similar configuration as that of the article discharge system 200 is also employed in the article discharge system 300. The arrangement of the grippers 30 in the article discharge system 300 will be described taking as an example two grippers, a gripper 30*a* and a gripper 30*b*, in FIG. 10.

In a movable member 220 to which the gripper 30*a* and the gripper 30*b* are attached, the heights of the places where the grippers 30 are attached to differ depending on the position in the movable member 220. The height of the place where the gripper 30*a* is attached to the movable member 220 is higher than the height of the place where the gripper 30*b* is attached to the movable member 220. More specifically, the height of the place where the sensor portion 42 of the weight acquisition unit 40 corresponding to the gripper 30*a* is attached to the movable member 220 is higher than the height of the place where the sensor portion 42 of the weight acquisition unit 40 corresponding to the gripper 30*b* is attached to the movable member 220.

When the movable member 220 is brought closer to the placement unit 250 by the robot 10, the gripper 30*a* grips the articles A placed on a first portion P1' of the placement surface 252*a* of the placement unit 250. At the same time, when the movable member 220 is brought closer to the placement unit 250 by the robot 10, the gripper 30*b* grips the articles A placed on a second portion P2' of the placement surface 252*a* of the placement unit 250. As shown in FIG. 10, the first portion P1' of the placement surface 252*a* is disposed in a higher position than the second portion P2' of the placement surface 252*a*.

Additionally, in the movable member 220, the lower end 32*ta* of the gripping members 32 of the gripper 30*a* are disposed in a higher position than the lower end 32*tb* of the gripping members 32 of the gripper 30*b*.

More preferably, a difference H1' between the height positions of the lower end 32*ta* of the gripping members 32 of the gripper 30*a* and the lower end 32*tb* of the gripping members 32 of the gripper 30*b* in the movable member 220 is designed to be identical to a difference H2' between the height positions of the first portion P1' of the placement surface 252*a* and the second portion P2' of the placement surface 252*a*. It will be noted that here the first portion P1' of the placement surface 252*a* slopes and the height of the placement surface 252*a* on which there are articles A gripped by the gripper 30*a* is not uniform. Also, the second portion P2' of the placement surface 252*a* slopes and the height of the placement surface 252*a* on which there are articles A gripped by the gripper 30*b* is not uniform. Therefore, representative values representing the height of the placement surface 252*a* (e.g., average values or median values of the height of the placement surface 152*a* at the first portion P1' and the second portion P2') can be regarded as the heights of the first portion P1' and the second portion P2' of the placement surface 252*a*.

<Example Modifications>

Example modifications of the embodiments will be described below. Some or all of the content of each example modification may also be combined with the content of another example modification to the extent that they are not incompatible with each other.

(1) Example Modification A

The type of the grippers 30 in the embodiments is merely an example, and various types of grippers can be applied as the grippers of the disclosure. For example, the grippers may also be a type that grips the articles A by moving a pair of gripping members toward each other.

Furthermore, in the embodiments, grippers 30 of an identical type are attached to the movable member 20, but the grippers are not limited to this, and two or more types of grippers 30 may also be attached to the movable member 20.

(2) Example Modification B

In the embodiments, the movable member 20 and the movable member 120 are moved in the vertical direction by the robot 10. Additionally, the grippers 30 attached to the movable member 20 and the movable member 120 move vertically downward from a predetermined position, come closer to the placement unit 50 and the placement unit 150, and grip some of the articles A of the article group A1 placed in the placement unit 50 and the placement unit 150.

Figure 11:
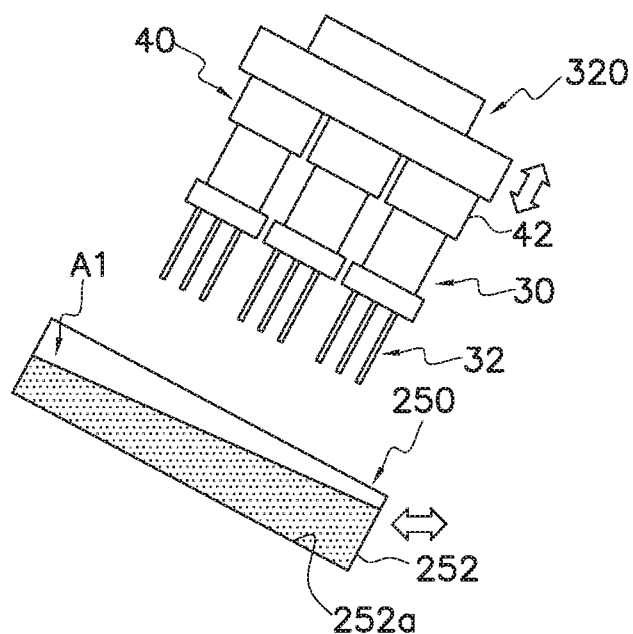
FIG. 11 is a schematic side view of main portions of an article discharge system pertaining to example modification B.

Instead of this configuration, a movable member 320 may also be configured to be movable in a direction that is inclined with respect to the vertical direction (see FIG. 11). For example, in a case where the placement surface 252a slopes as in the placement unit 250 of the example modification of the second embodiment, by configuring the movable member 320 to be moved in a generally perpendicular direction with respect to the placement surface 252a, it is easy for each of the grippers 30 to grip an appropriate quantity of the articles A even in a case where the height position of the placement surface 252a differs.

(3) Example Modification C

In the embodiments, the placement unit drive unit 54 moves the placement units 50, 150 between the first position and the second position. However, the placement units 50, 150 are not limited to this configuration and may also be immovable.

Figure 12:
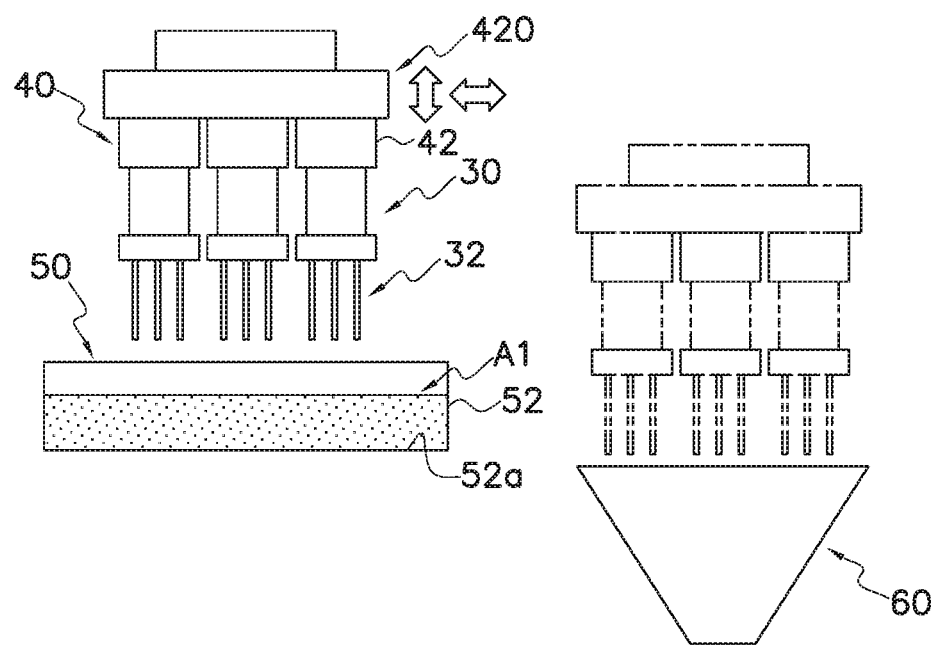
FIG. 12 is a schematic side view of main portions of an article discharge system pertaining to example modification C.

In this case, as shown in FIG. 12, the discharge chute 60 is disposed in a place other than directly under the placement units 50, 150, and it is preferred that a movable member 420 be configured to be movable not only in the vertical direction but also in the horizontal direction. In this article discharge system, the grippers 30 grip the articles A in the placement units 50, 150 (see the solid lines in FIG. 12), then the grippers 30 are moved to above the discharge chute 60 (see the long dashed double-short dashed lines in FIG. 12), and then the grippers 30 releases the articles A to discharge the articles A.

However, in the case of configuring the article discharge system in this way, there is the potential for the articles A to become more likely to drop because a force in the horizontal direction also acts on the articles A when the grippers 30 move horizontally, so it is preferred that the placement units 50, 150 be configured to be movable between the first position and the second position.

(4) Example Modification D

In the embodiments, the robot 10 moves the movable member 20 along a single axis. However, the robot 10 is not limited to this configuration and may also move the movable member 20 in plural directions. For example, the robot 10 may also reciprocally move the movable member 20 in a horizontal direction orthogonal to the vertical direction so as to shake off articles sticking to the gripping members 32 when moving the movable member 20 upward away from the placement units 50, 150 (when moving the position of the movable member 20 from the position illustrated in FIG. 8B to the position illustrated in FIG. 8C).

(5) Example Modification E

In the embodiments, the articles A are discharged from the discharge chute 60, but the articles A may be discharged from the article discharge system in another way. For example, the article discharge system may have, instead of the discharge chute 60, a discharge conveyor for discharging the articles A from the article discharge system 100. Additionally, the grippers 30 corresponding to the weight values selected for a combination by the combination calculation may be configured to drop the articles A onto the discharge conveyor by releasing the articles A in a predetermined position above the discharge conveyor, so that the discharge conveyor conveys the articles that have dropped onto the discharge conveyor.

(6) Example Modification F

Figure 15A:
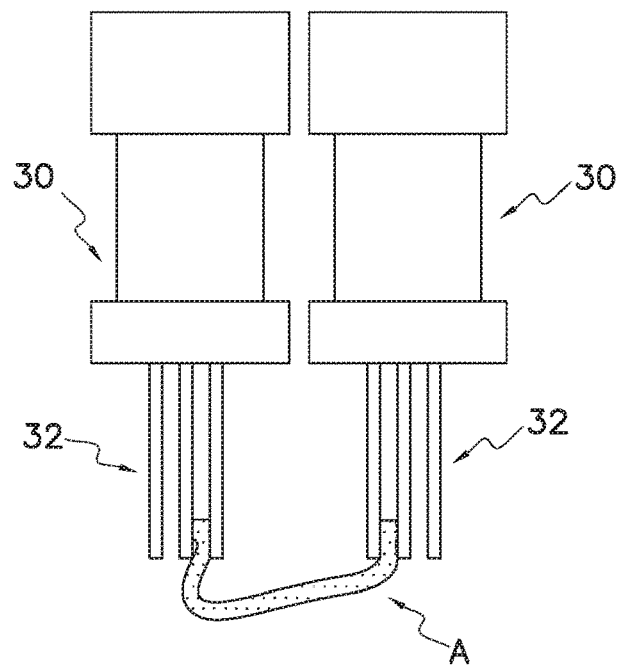
FIG. 15A schematically illustrates a state in which one article is being gripped by two grippers.

Depending on the type of the articles A that are handled, there is the potential for a situation to occur where an article A gripped by one gripper 30 is also simultaneously gripped by another gripper 30. For example, in a case where the articles A are articles, such as spaghetti, long in length (e.g., in a case where the length of the articles A is longer than the distance of the gripping areas of adjacent grippers 30), there is the potential for a phenomenon to occur where, as in FIG. 15A, an article A that one gripper 30 grips is also simultaneously gripped by another gripper 30. It will be noted that FIG. 15A is a schematic diagram for description, and illustration of articles A other than the article A gripped by more than one gripper 30 is omitted. When such a situation occurs, there is a concern that the weight of the articles discharged from the system will deviate from the target weight, resulting in a drop in the accuracy of the weight discharged from the system.

Figure 13:
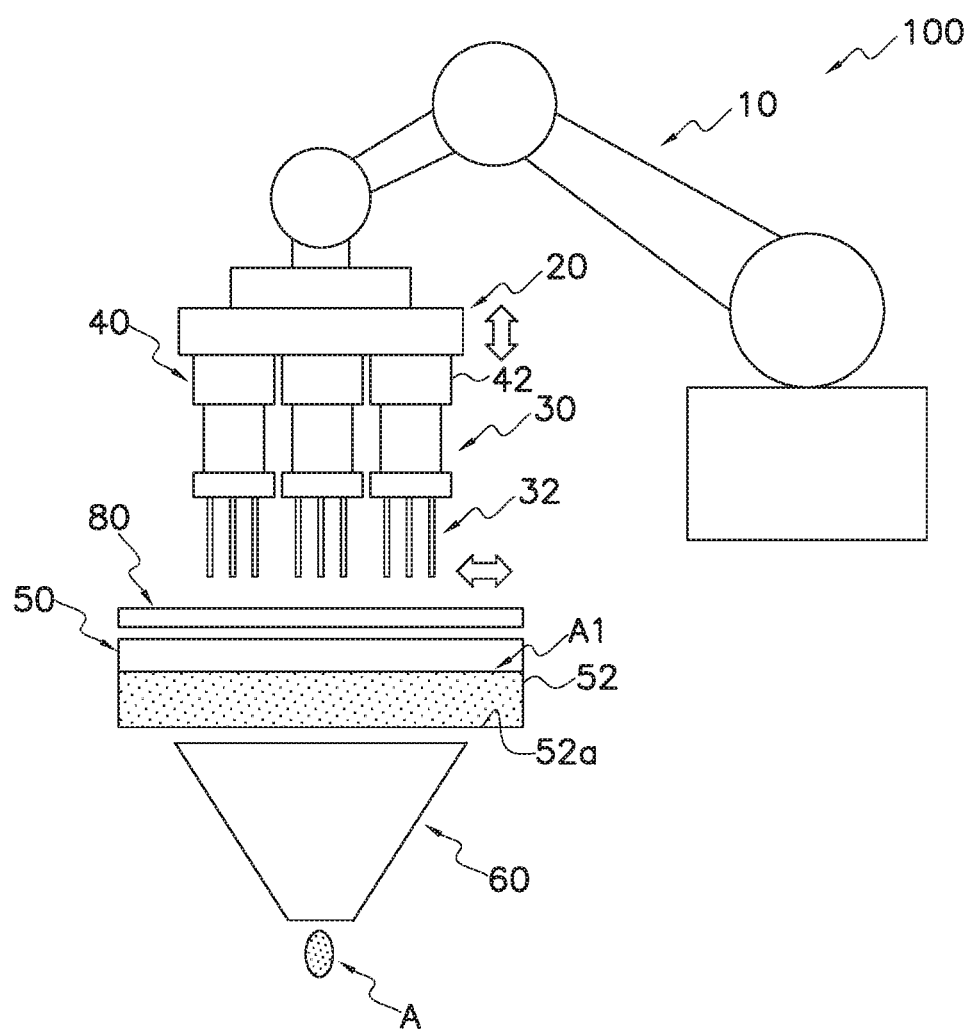
FIG. 13 is a schematic view showing the article discharge system pertaining to example modification F.
Figure 14:
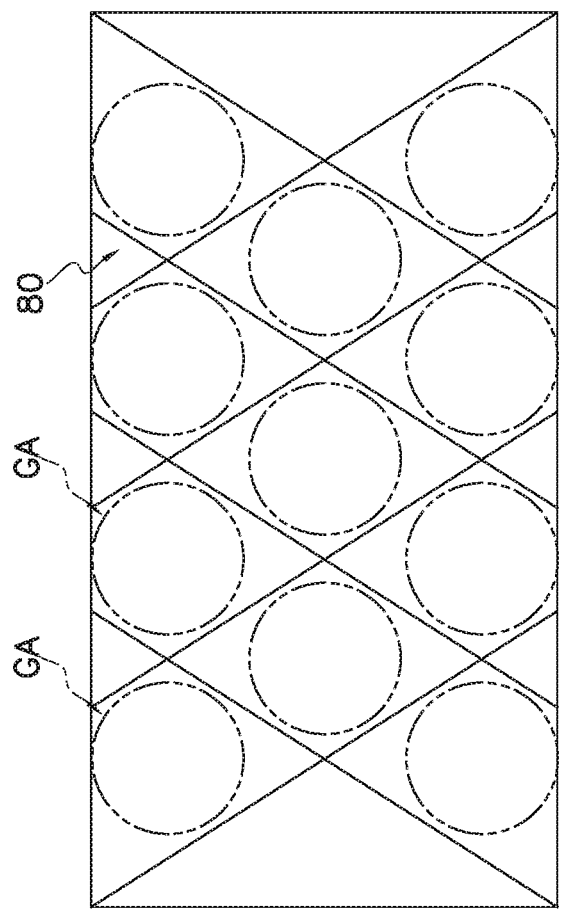
FIG. 14 is a plan view schematically showing the gripping areas of the grippers separated by a separation member in the article discharge system of FIG. 13.

To inhibit the occurrence of such a state, as shown in FIG. 13 and FIG. 14, it is preferred that a separation member 80 that is disposed between the gripping members 32 of adjacent grippers 30 be provided above the placement unit 50 at least during a predetermined period after the gripping members 32 of the grippers 30 grip the articles A in the placement unit 50 until they release the articles A. It will be noted that, if the separation member 80 is under the dropping articles A when the grippers 30 release the articles A and drop the articles A into the discharge chute 60, there is the potential for the articles A to get caught on the separation member 80. For that reason, when the grippers 30 release the articles A and drop the articles A into the discharge chute 60, it is preferred that the separation member 80 move to a position where it will not obstruct the dropping of the articles A into the discharge chute 60. For example, the separation member 80 can be moved to a place other than directly under the grippers 30 at the same time that the placement unit 50 moves from the first position to the second position.

Figure 15B:
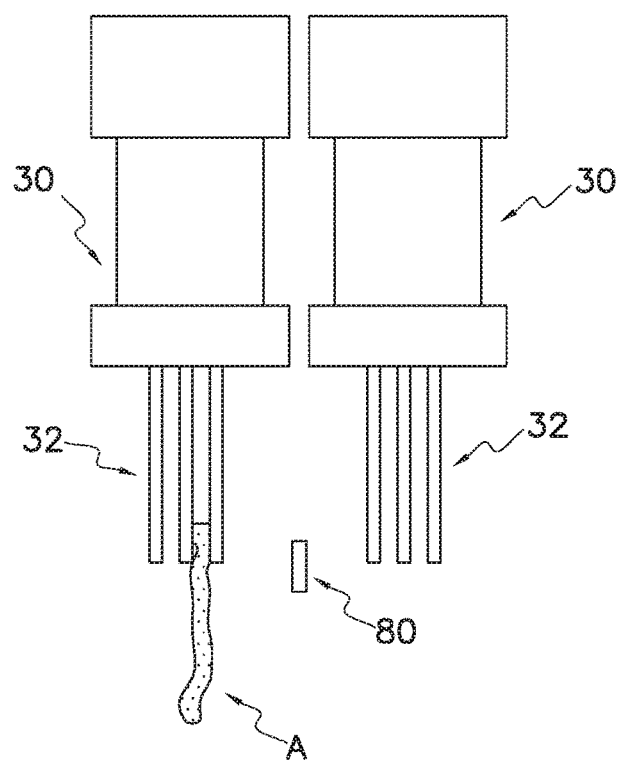
FIG. 15B schematically illustrates a state in which the gripping areas of the two grippers are separated by the separation member of FIG. 13.

Here, the separation member 80 is, for example, as shown in FIG. 14, a net-like member that separates the gripping areas GA of the grippers 30 as seen in plan view. Because the separation member 80 is present at least temporarily between the gripping members 32 of adjacent grippers 30 after the gripping members 32 of the grippers 30 grip the articles A in the placement unit 50 until they release the articles A, the articles A contact the separation member 80 so that, as in FIG. 15B, it is easy for the articles A to escape the grip of one gripper 30. Alternatively, although it is not shown in the drawings, it is also possible for the articles A to be cut by the separation member 80 as a result of the separation member 80 being present at least temporarily between the gripping members 32 of adjacent grippers 30 after the gripping members 32 of the grippers 30 grip the articles A in the placement unit 50 until they release the articles A. For example, a state in which an identical article A is gripped by more than one gripper 30 tends to be eliminated as a result of the separation member 80 being present between the gripping members 32 of adjacent grippers 30 when the grippers 30 are moved upward (when the grippers 30 are changed from the state in FIG. 8B to the state in FIG. 8C) after the gripping members 32 have gripped the articles A in the placement unit 50. For that reason, the occurrence of a phenomenon such as shown in FIG. 15A where an article A gripped by one gripper 30 is also simultaneously gripped by another gripper 30 is easily reduced.

It will be noted that, for the separation member, a tubular structure may also be employed instead of a net-like structure. In the case of employing a separation member with this kind of structure, the separation member can be made to function as passages for discharging the articles A by disposing, with respect to each of the grippers 30, the separation member with the tubular structure so as to surround the gripping members 32 and extend downward beyond the distal ends of the gripping members 32. In a case where the separation member is configured in this way, the potential for the articles A to get caught on the separation member is inhibited even if the separation member is present lower than the gripping members 32 when the grippers 30 drop the articles A into the discharge chute 60.

(7) Example Modification G

In the embodiments, the article discharge systems 100, 200 have one movable member 20, 120, but the article discharge systems 100, 200 are not limited to this and may also have more than one movable member 20, 120 to which the plural grippers 30 are attached.

(8) Example Modification H

In the embodiments, as an example of the arrangement of the grippers 30, a configuration is described where the plural grippers 30 are arranged in a staggered manner when the plural grippers 30 attached to the movable member 20 are viewed from the gripping member 32 side. However, this arrangement of the grippers 30 is merely an example, and the way in which the grippers 30 are arranged can be appropriately selected in accordance, for example, with the shape of the gripping areas of the grippers 30 and the dimension of the opening on the article input side of the discharge chute 60 into which the grippers 30 discharge the articles A.

For example, in the embodiments, a case where the gripping areas of the grippers 30 are generally circular in shape is described as an example, and the plural grippers 30 are arranged in a staggered manner when the plural grippers 30 attached to the movable member 20 are viewed from the gripping member 32 side. However, in a case where the gripping areas of the grippers 30 are generally rectangular in shape, the plural grippers 30 may also be arranged in a grid-like manner when the plural grippers 30 attached to the movable member 20 are viewed from the gripping member 32 side.

Furthermore, the positions where the grippers 30 are attached to the movable member 20 may be configured to be adjustable.

ADDITIONAL REMARK

The article discharge systems described above are merely specific examples of the article discharge system and are not intended to limit the technical scope of the disclosure. It will be understood that various modifications may be made to the embodiments without departing from the spirit and scope of the disclosure.

REFERENCE SIGNS LIST

10 Robot (First Drive Unit)
20, 120, 220, 320, 420 Movable Members
30 Grippers
30a First Gripper
30b Second Gripper
32 Gripping Members
32ta Lower End of Gripping Member of First Gripper
32tb Lower End of Gripping Members of Second Gripper
40 Weight Acquisition Units
50, 150, 250 Placement Units
52a, 152a, 252a Placement Surfaces
54 Placement Unit Drive Unit (Second Drive Unit)
60 Discharge Chute
70 Control Unit
80 Separation Member
100, 200, 300 Article Discharge Systems
A1 Article Group
A Articles
GA Gripping Areas
P1, P1' First Portions of Placement Surfaces
P2, P2' Second Portions of Placement Surfaces

CITATION LIST

Patent Literature

Patent Document 1: JP-A No. H6-3182

What is claimed is:

1. An article discharge system that pulls out some articles from an article group and discharges them, the article discharge system comprising:
   a placement unit in which the article group is placed;
   plural grippers that grip, with gripping members, the articles;
   a movable member to which the plural grippers are attached;
   a first drive unit that moves the movable member;
   weight acquisition units that acquire weight values of the articles that each of the grippers grips; and
   a control unit that moves the movable member, brings the plural grippers closer to the placement unit, causes the plural grippers to grip some of the articles of the article group placed in the placement unit, and, based on a result of a combination calculation using the weight values of the articles that each of the grippers grips and which the weight acquisition units have acquired, causes predetermined grippers among the plural grippers to release the articles and thereby discharge the articles,
   wherein
   the first drive unit is configured to integrally move the plural grippers attached to the movable member and insert the plural grippers into the article group.

2. The article discharge system according to claim 1, wherein
   the control unit moves the movable member at least downward from a predetermined position to bring the plural grippers closer to the placement unit when the grippers are to grip the articles in the placement unit,
   the placement unit has a placement surface on which the article group is placed,
   the plural grippers include at least a first gripper and a second gripper,
   a first portion of the placement surface on which are placed the articles that the first gripper grips is disposed in a higher position than a second portion of the placement surface on which are placed the articles that the second gripper grips, and in the movable member, a lower end of the gripping member of the first gripper is disposed in a higher position than a lower end of the gripping member of the second gripper.

3. The article discharge system according to claim 2, wherein a difference between height positions of the lower end of the gripping member of the first gripper and the lower end of the gripping member of the second gripper in the movable member is identical to a difference between the height positions of the first portion of the placement surface and the second portion of the placement surface.

4. The article discharge system according to claim 1, wherein the plural grippers are arranged in a staggered manner when the plural grippers are viewed from the gripping member side.

5. The article discharge system according to claim 1, wherein a gripping area in which each of the grippers can grip the articles in the placement unit is in proximity to or partially overlaps a gripping area in which at least one other gripper can grip the articles in the placement unit.

6. The article discharge system according to claim 1, further comprising a discharge chute that is disposed directly under the grippers and receives and discharges the articles that the grippers have released and a second drive unit that moves the placement unit, wherein the first drive unit moves the movable member in a vertical direction, and the second drive unit moves, in a direction intersecting the vertical direction, the placement unit between a first position directly under the grippers and a second position away from directly under the grippers.

7. The article discharge system according to claim 1, further comprising a separation member that is disposed between the gripping members of adjacent grippers at least during a predetermined period after the gripping members of the grippers grip the articles in the placement unit until they release the articles.

8. The article discharge system according to claim 1, wherein each of the plural grippers is configured to separately grip at least one of the articles with the gripping members.

* * * * *